United States Patent [19]

Kohr et al.

[11] Patent Number: 5,779,762
[45] Date of Patent: *Jul. 14, 1998

[54] METHOD FOR IMPROVING THE HEAP BIOOXIDATION RATE OF REFRACTORY SULFIDE ORE PARTICLES THAT ARE BIOOXIDIZED USING RECYCLED BIOLEACHATE SOLUTION

[75] Inventors: William J. Kohr, San Mateo; Chris Johansson, San Bruno; John Shield, San Mateo; Vandy Shrader, Belmont, all of Calif.

[73] Assignee: Geobiotics, Inc., Hayward, Calif.

[ * ] Notice: The term of this patent shall not extend beyond the expiration date of Pat. No. 5,688,304.

[21] Appl. No.: 547,894

[22] Filed: Oct. 25, 1995

Related U.S. Application Data

[63] Continuation-in-part of Ser. No. 329,002, Oct. 25, 1994, abandoned.

[51] Int. Cl.[6] .................................................. C22B 3/18
[52] U.S. Cl. ........................... 75/712; 75/724; 75/743; 75/744; 204/109; 423/DIG. 17
[58] Field of Search .............................. 75/712, 724, 743, 75/744; 204/109; 423/DIG. 17

[56] References Cited

U.S. PATENT DOCUMENTS

| | | | |
|---|---|---|---|
| 588,476 | 8/1897 | Rhodes . | |
| 3,777,004 | 12/1973 | Lankenau et al. | 423/20 |
| 3,819,797 | 6/1974 | Spedden et al. | 423/27 |
| 3,949,051 | 4/1976 | Pawlek | 423/28 |
| 4,017,309 | 4/1977 | Johnson | 75/101 |
| 4,056,261 | 11/1977 | Darrah | 266/101 |
| 4,256,705 | 3/1981 | Heinen et al. | 423/27 |
| 4,256,706 | 3/1981 | Heinen et al. | 423/29 |
| 4,279,868 | 7/1981 | Von Kohom | 423/29 |
| 4,301,121 | 11/1981 | Von Kohom | 423/1 |

(List continued on next page.)

FOREIGN PATENT DOCUMENTS

| | | |
|---|---|---|
| 0522978 A1 | 10/1992 | European Pat. Off. . |
| 2180929 | 4/1987 | United Kingdom . |

OTHER PUBLICATIONS

Alexander, B., S. Leach and w.J. Ingledew, *The Relationship between Chemisomotic Parameters and Sensitivity to Anions and Organic Acids in the Acidophile Thiobacillus ferrooxidan*, Journal of General Microbiology, 1987. 133: pp. 1171–1179.

Boon, M. and J.J. Heijnen, *Mechanisms and Rate Limiting Steps in Bioleaching of Sphalerite, Chalcopyrite and Pyrite with Thiobacilus ferrooxidans*, Biohydrometallurgical Technologies, 1993 (Jackson Hole, Wyoming): The Minerals, Metals and Materials Society, pp. 217–235.

(List continued on next page.)

*Primary Examiner*—Melvyn Andrews
*Attorney, Agent, or Firm*—Lyon & Lyon LLP

[57] ABSTRACT

A method for improving the heap biooxidation rate of refractory sulfide ore particles that are at least partially biooxidized using a recycled bioleachate off solution is provided. The method includes the steps of biooxidizing a heap of refractory sulfide ore particles with a bioleachate solution; collecting, from the heap, a bioleachate off solution that includes a plurality of inhibitory materials dissolved therein, the concentration of each individual inhibitory material being below its individual inhibitory concentration but the combined concentration of at least two of the inhibitory materials being sufficient to inhibit the biooxidation rate of the refractory sulfide ore particles; conditioning the bioleachate off solution to reduce the inhibitory effect caused by the combined concentration of the at least two inhibitory materials; recycling the reconditioned bioleachate solution to the to the heap; and biooxidizing the refractory sulfide ore particles in the heap with the reconditioned bioleachate solution.

40 Claims, 9 Drawing Sheets

U.S. PATENT DOCUMENTS

| | | | |
|---|---|---|---|
| 4,318,892 | 3/1982 | Von Kohorn | 423/279 |
| 4,324,764 | 4/1982 | Hasegawa et al. | 422/159 |
| 4,343,773 | 8/1982 | Miller et al. | 423/1 |
| 4,374,097 | 2/1983 | Holland | 423/22 |
| 4,402,831 | 9/1983 | Beardsmore et al. | 210/606 |
| 4,424,194 | 1/1984 | Hughes | 423/1 |
| 4,526,615 | 7/1985 | Johnson | 75/101 |
| 4,557,905 | 12/1985 | Sherman et al. | 423/27 |
| 4,571,387 | 2/1986 | Bruynesteyn et al. | 435/262 |
| 4,585,548 | 4/1986 | Cadzow | 209/5 |
| 4,690,894 | 9/1987 | Brierley et al. | 435/244 |
| 4,721,526 | 1/1988 | Elmore et al. | 75/118 |
| 4,729,788 | 3/1988 | Hutchins et al. | 75/118 |
| 4,740,243 | 4/1988 | Krebs-Yuill et al. | 75/101 |
| 4,752,332 | 6/1988 | Wu et al. | 75/101 |
| 4,778,519 | 10/1988 | Pesic | 75/118 |
| 4,789,481 | 12/1988 | Brierley et al. | 210/661 |
| 4,888,293 | 12/1989 | Hackl et al. | 435/245 |
| 5,127,942 | 7/1992 | Brierley et al. | 75/743 |
| 5,162,105 | 11/1992 | Kleid et al. | 423/29 |
| 5,196,052 | 3/1993 | Gross et al. | 75/712 |
| 5,232,676 | 8/1993 | Wolff et al. | 423/210 |
| 5,236,677 | 8/1993 | Torres-Cardona et al. | 423/230 |
| 5,244,493 | 9/1993 | Brierley et al. | 75/743 |
| 5,246,486 | 9/1993 | Brierley et al. | 75/743 |
| 5,449,397 | 9/1995 | Hunter et al. | 75/744 |

OTHER PUBLICATIONS

Brierley, J.A., *Bacterial Processes for Transformation of Metals*, Environmental Speciation and Monitoring Needs for Trace Metal–Containing Substances from Energy–Related Processes, New Mexico Institute of Mining and Technology, pp. 264–273, May 1981.

Bruynesteyn, A., *Biological Treatment of Refractory Gold Ores*, In BioMIne'93, 1993 (Adelaide, South Australia): Australian Mineral Foundation, pp. 3.1–3.7.

Collinet, Marie–Noelle et al., *Characterization of arsenopyrite oxidizing Thiobacillus: Tolerance to arsenite, arsenate, and ferrous and ferric iron*, Antonie Van Leeuwenhoek 1990: 57: pp. 237–244.

Cornachione, M.A., and Johnson, A.M., *Laboratory Investigation of Bio–Heap Leaching to Remove Sulfer from Kiln Feed Materials*, Mining Engineering, Feb. 1994: pp. 153–156.

Garcia, O., Jr. and L.L. da Silva, *Differences in Growth and Iron Oxidation among Thiobacillus ferrooxidans Cultures in the presence of some toxic metals*, Biotechnology Letters, 1991, 13(8): pp. 567–570.

Lawrence, R.W., *Biotreatment of Gold Ores*, in Microbial Mineral Recovery, H.L. Ehrlich and C.L. Brierly, Editors (1990, McGraw–Hill, New York), pp. 127–148.

LeChevallier Mark W. et al., *Factors Promoting Survival of Bacteria in Chlorinated Water Supplies*, Applied and Environmental Microbiology, 1988, 54(3): pp. 649–654.

Lizama, Hector M. and I. Suzuki, *Synergistic Competitive Inhibition of Ferrous Iron Oxidation by Thiobacillus ferrooxidans by Increasing Concentrations of Ferric Iron and Cells*, Applied and Environmental Microbiology, 1989, 55(10): pp. 2588–2591.

Mahapatra S.S. Roy and Misha, Ajit K., *Inhibition of Iron Oxidation in Thiobacillus ferrooxidans by Toxic Metals and Its Alleviation by EDTA*, Current Microbiology, 1984, 11: pp. 1–6.

Morin, D. and P. Ollivier, *Pilot practice of continuous bioleaching of a refractory gold sulfide concentrate with a high As content*, International Symposium of Biohydrometallurgy (1989) (Jackson Hole, Wyoming), Canadian Centre for Mineral and Energy Technology, pp. 563–576.

Menon, A.G. and Dave, S.R., *Biooxidation of Ferrous by Ultraviolet–Exposed Silver Tolerant Thiobacillus ferrooxidans (ore–isolate)*, Journal of Biotechnology, 1994, 38: pp. 7–9.

Nagpal, S. et al., *Effect of Sodim Iospropyl Xanthate on the Bioleaching of a Pyrite–Arsenopyrite Ore Concentrate*, Biohydrometallurgical Technologies, 1993 (Jackson Hole, Wyoming), Canadian Centre for Mineral and Energy Technology, pp. 450–458.

Natarajan, K.A. et al., *Stability of copper tolerance in Thiobacillus ferrooxidans*, Antonie Van Leeuwnhoek, 1994, 66: pp. 303–306.

Norris, P.R. and Kelly, D.P., *Toxic metals in leaching systems*, In: Murr et al., Editors, Metallurgical Applications of Bacterial Leaching and Related Microbiological Phenomena, New York (Academic Press), 1978: pp. 83–102.

Odd, Paul A.R. et al., *Bioleaching –A Feasible Process for Wiluna Refractory Gold Ores*, in BioMIne'93, 1993 (Adelaide, South Australia), Australian Mineral Foundation.

Ollivier, P. and D. Morin, *Bioleaching of Sulfide Concentrates and Ores: Study of Refractory Gold and Non–Ferrous Base Metals Ores*, Randol Gold Forum (1990) (Olympic Valley, California), Randol International, pp. 93–99.

Paknikar, K.M. and A.D. Agate, *Occurrence of a Thiobacillus ferrooxidans strain tolerating unusally high concentrations of metals and an associated metal–tolerant acidolphilic heterotrophic bacterium*, BioHydroMetallurgy (1987) (Warwick United Kingdom: Science and Technology Letters), pp. 558–560.

Rongqing, Q. and H. Kongxuan, *Bioleaching of Arsenic Bearing Refractory Gold Concentrates*, Randol Gold Forum (1992) (Vancouver, British Columbia), Randol International, pp. 453–458.

Roy, P. and A.K. Mishra, *Iron Oxidation not Coupled to Growth in Thiobacillus ferrooxidans in Presence of Toxic Metals*, Journal of Applied Bacteriology (1981), 51: pp. 387–392.

Rusin, P. et al., *Elimination of Toxic Factors in Leachate to Enhance Biooxidation of Sulfide Ores*, SME Annual Meeting (1994 (Albuquerque, N.M.), Mining Engineering, pp. 1–5.

Sugio, T. et al., *Inhibition of iron–oxidizing activity by bisulfite ion in Thiobacillus ferrooxidans*, Biosci. Biotech. Biochem. (1994), 58(5): pp. 2109–2110.

Suzuki, I. et al., *Competitive Inhibition of Ferrous Iron Oxidation by Thiobacillus ferrooxidans by Increasing Concentrations of Cells*, Applied and Environmental Microbiology (1989), 55(5): pp. 1117–1121.

Thompson, D.L. et al., *Bioextraction of Cobalt from Complex Metal Sulfides*, Biohydrometallurgical Technologies (1993) (Jackson Hole, Wyoming), The Minerals, Metals and Materials Society, pp. 653–664.

Touvinen, O.H. et al., *Inhibition by pyrite of bacterial ion oxidation activity*, Biogeochemistry of ancient and modern environments (1979), pp. 529–536.

Touvinen, O.H. et al., *Silver Toxicity to Ferrous Iron and Pyrite Oxidation and Its Alleviation by Yeast Extract in Cultures of Thiobacillus ferrooxidans*, Biotechnology Letters (1985), 7(6): pp. 389–394.

Touvinen, O.H. et al., *Tolerance of Thiobacillus ferrooxidans to some metals*, Antonie van Leeuwenhoek (1971), 37: pp. 489–496.

Zagury, G.J. et al., *Adaptation of Indigenous Iron–Oxidizing Bacteria for Bioleaching of Heavy Metals in Contaminated Soils*, Environmental Technology (1994), 15: 517–530.

Ingelias, N. and F. Carranza, *Refractory gold–bearing ores: A review of treatment methos and recent advances in biotechnological techniques*, Hydrometallurgy (1994), 34: pp. 383–395.

Harries, J.R. et al., *Rate controls on leaching in pyritic mine wastes*, BioHydroMetallurgy (1987) (Warwick United Kingdom), Science and Technology Letters, pp. 233–241.

Silver et al., *Oxidation of metal sulfides by Thiobacillus ferrooxidans grown on different substrates*, Can J. Microbiol (1974), 20: pp. 141–147.

Tuovinen, O. et al., *Studies of the growth of Thiobacillus ferrooxidans, II. Toxicity of Uranimum to growing cultures and tolerance conf* Arch Microbiol 95 pp. 153–164 1974.

Torma, A., *Mineral Bioprocessing*, Biomine '93 Conference, Mar. 22–23, 1993, Adelaide, South Africa, pp. 1.1–1.10.

Henley, K.J., et al., *The Mineralogy of Refractory Gold Ores*, Biomine '93 Conference, Mar. 22–23, 1993, Adelaide, South Africa, pp. 5.1–5.13.

Ritchie, A.I.M., et al., *Optimisation of Oxidation Rates in Dump Oxidation of Pyrite–Gold Ores*, Biomine '93 Conference, Mar. 22–23, 1993, Adelaide, South Africa, pp. 9.1–9.8.

Kelley, B.C., et al., *Bioremediation –Applications to Waste Processing in the Mining Industry*, Biomine '93 Conference, Mar. 22–23, 1993, Adelaide, South Africa, pp. 10.1–10.10.

Fraser, G.M., *Mixing and Oxygen Transfer in Mineral Bioleaching*, Biomine '93 Conference, Mar. 22–23, 1993, Adelaide, South Africa, pp. 16.1–16.11.

Nicholson, H., et al., *Selection of a Refractory Gold Treatment Process for the Sansu Project*, Biomine '93 Conference, Mar. 22–23, 1993, Adelaide, South Africa, pp. 20.1–20.11.

Untung, S.R., et al., *Application of Bio–Leaching to Some Indonesian Sulphide Ores (A Preliminary Study)*, Biomine '93 Conference, Mar. 22–23, 1993, Adelaide, South Africa, pp. 11.1–11.10.

Fraser, K.S., et al., *Processing of Refractory Gold Ores*, Minerals Engineering, vol. 4, Nos. 7–11, pp. 1029–1041, 1991.

Brierley, C.L., *Mineral Bio–Processing: Opportunities in Extractive Metallurgy and Environmental Control*, NIST, Nov. 1993, pp. 1–29.

Merson, J., *Mining With Microbes*, New Scientist, 4, Jan. 1991, pp. 17–19.

Browner, R.E., et al., *Studies on the Heap Leaching Characteristics of Western Australian Gold Ores*, World Gold (1991).

Mihaylov, B., et al., *Gold Recovery From A Low–Grade Ore Employing Biological Pretreatment in Columns*, Biohydrometallurgical Technologies, The Minerals, Metals & Materials Society, 1993, pp. 499–511.

Brierly, J.A., et al., *Biooxidation–Heap Concept For Pretreatment Of Refractory Gold Ore*, Biohydrometallurgical Technologies, The Minerals, Metals & Materials Society, 1993, pp. 437–448.

Harrington, J.G., et al., *Engineering Aspects Of Heap Biooxidation Of Coarse–Crushed Refractory Gold Ores*, Biohydrometallurgical Technologies, The Minerals, Metals & Materials Society, 1993, pp. 521–530.

Ahonen, L., et al., *Redox Potential–Controlled Bacterial Leaching Of Chalcophyrite Ores*, Biohydrometallurgical Technologies, The Minerals, Metals & Materials Society, 1993, pp. 571–578.

Pantelis, G., et al., *Optimising Oxidation Rates In Heaps Of Pyritic Material*, Biohydrometallurgical Technologies, The Minerals, Metals & Materials Society, 1993, pp. 731–738.

Mihaylov, B., et al., *Biooxidation Of A Sulfide Gold Ore In Columns*, Mineral Bioprocessing, The Minerals, Metals & Materials Society, 1991, pp. 163–177.

Lizama, H.M., et al., *Bacterial Leaching Of Copper And Zinc From A Sulfide Ore By A Mixed Culture Of Thiobacillus Ferrooxidans And Thibobacillus Thiooxidans In Laboratory Scale And Pilot Plant Scale Columns*, Biohydrometallurgy, 1989, pp. 519–531.

METHOD FOR IMPROVING THE HEAP BIOOXIDATION RATE OF REFRACTORY SULFIDE ORE PARTICLES THAT ARE BIOOXIDIZED USING RECYCLED BIOLEACHATE SOLUTION

This application is a continuation-in-part of copending application Ser. No. 08/329,002, filed Oct. 25, 1994 now abandoned. The 08/329,002 application is hereby incorporated by reference.

BACKGROUND OF THE INVENTION

1. Field of the Invention

The present invention relates to the recovery of metal values from refractory sulfide and refractory carbonaceous sulfide ores. More particularly, the present invention relates to the heap biooxidation of refractory sulfide ores using a recycled bioleachate solution.

2. Description of the Prior Art

Gold is one of the rarest metals on earth. Gold ores can be categorized into two types: free milling and refractory. Free milling ores are those that can be processed by simple gravity techniques or direct cyanidation. Refractory ores, on the other hand, are not amenable to conventional cyanidation treatment. Gold bearing deposits are deemed refractory if they cannot be economically processed using conventional cyanide leaching techniques because insufficient gold is solubilized. Such ores are often refractory because of their excessive content of metallic sulfides (e.g., pyrite and arsenopyrite) and/or organic carbonaceous matter.

A large number of refractory ores consist of ores with a precious metal such as gold occluded in iron sulfide particles. The iron sulfide particles consist principally of pyrite and arsenopyrite. If the gold, or other precious metal, remains occluded within the sulfide host, even after grinding, then the sulfides must be oxidized to liberate the encapsulated precious metal values and make them amenable to a leaching agent (or lixiviant) ; thus, the sulfide oxidation process reduces the refractory nature of the ore.

A number of processes for oxidizing the sulfide minerals to liberate the precious metal values are well known in the art. These methods can generally be broken down into two types: mill operations and heap operations. Mill operations are typically expensive processes having high operating and capital costs. As a result, even though the overall recovery rate is typically higher for mill type processes, mill operations are not applicable to low grade ores, that is ores having a gold concentration less than approximately 0.07 oz/ton, and even as low as approximately 0.02 oz/ton.

Two well known methods of oxidizing sulfides in mill type operations are pressure oxidation in an autoclave and roasting.

Oxidation of sulfides in refractory gold ores can also be accomplished using acidophilic, autotrophic microorganisms, such as *Thiobacillus ferrooxidans*, Sulfolobus, Acidianus species and facultative-thermophilic bacteria in a microbial pretreatment. These microorganisms can utilize the oxidation of sulfide minerals as an energy source during metabolism. During the oxidation process, the foregoing microorganisms oxidize the iron sulfide particles to cause the solubilization of iron as ferric iron, and sulfide, as sulfate ion.

Oxidation of refractory sulfide ores using microorganisms, or, as often referred to, biooxidation, can be accomplished in a mill process or a heap process.

Compared to pressure oxidation and roasting, biooxidation processes are simpler to operate, require less capital, and have lower operating costs. Indeed, biooxidation is often chosen as the process for oxidizing sulfide minerals in refractory sulfide ores because it is economically favored over other means to oxidize the ore. However, because of the slower oxidation rates associated with microorganisms when compared to chemical and mechanical means to oxidize sulfide refractory ores, biooxidation is often the limiting step in the mining process.

One mill type biooxidation process involves comminution of the ore followed by treating a slurry of the ore in a bioreactor where microorganisms can use the finely ground sulfides as an energy source. Such a mill process was used on a commercial scale at the Tonkin Springs mine. However, the mining industry has generally considered the Tonkin Springs biooxidation operation a failure. A second mill type biooxidation process involves separating the gold bearing sulfides from the ore using conventional sulfide concentrating technologies, such as flotation, and then oxidizing the sulfides in a stirred bioreactor to alleviate their refractory nature. Commercial operations of this type are in use in Africa, South America and Australia.

Biooxidation in a heap process typically entails forming a heap of refractory sulfide ore particles and then inoculating the heap with a microorganism capable of biooxidizing the sulfide minerals in the ore. After biooxidation has come to a desired end point, the heap is drained and washed out by repeated flushing. The liberated precious metal values are now ready to be leached with a suitable lixiviant. Typically precious metal containing ores are leached with cyanide because it is the most efficient leachant or lixiviant for the recovery of the precious metal values from the ore. However, if cyanide is used as the lixiviant, the heap must first be neutralized.

Because biooxidation occurs at a low, acidic pH while cyanide processing must occur at a high, basic pH, heap biooxidation followed by conventional cyanide processing is inherently a two step process. As a result, processing options utilizing heap biooxidation must separate the two steps of the process. This is conventionally done by separating the steps temporally. For example, in heap biooxidation, the heap is first biooxidized and then rinsed, neutralized and treated with cyanide. To accomplish this economically and practically, most heap biooxidation operations use a permanent heap pad in one of several ore on—ore off configurations.

Of the various biooxidation processes available, heap biooxidation has the lowest operating and capital costs. This makes heap biooxidation processes particularly applicable to low grade or waste type ores, that is ores having a gold (or equivalent precious metal value) concentration of less than about 0.07 oz/ton. Heap biooxidation, however, has very slow kinetics compared to mill biooxidation processes. Heap biooxidation can require many months in order to sufficiently oxidize the sulfide minerals in the ore to permit gold or other precious metal values to be recovered in sufficient quantities by subsequent cyanide leaching for the process to be considered economical. Heap biooxidation operations, therefore, become limited by the length of time required for sufficient biooxidation to occur to permit the economical recovery of gold. The longer the time required for biooxidation the larger the permanent pad facilities and the larger the necessary capital investment. At mine sites where the amount of land suitable for heap pad construction is limited, the size of the permanent pad can become a limiting factor in the amount of ore processed at the mine and thus the profitability of the mine. In such circumstances, rate limiting conditions of the biooxidation process become even more important.

The rate limiting conditions of the heap biooxidation process include inoculant access, nutrient access, air or oxygen access, and carbon dioxide access, which are required to make the process more efficient and thus an attractive treatment option. Moreover, for biooxidation, the induction times concerning biooxidants, the growth cycles, the biocide activities, viability of the bacteria and the like are important considerations because the variables such as accessibility, particle size, settling, compaction and the like are economically irreversible once a heap has been constructed. As a result, heaps cannot be repaired once formed, except on a limited basis.

The methods disclosed in U.S. Pat. No. 5,246,486, issued Sep. 21, 1993, and U.S. Pat. No. 5,431,717, issued Jul. 11, 1995, by one of the above named inventors, both of which are hereby incorporated by reference, are directed to increasing the efficiency of the heap biooxidation process by ensuring good fluid flow (both gas and liquid) throughout the heap.

Solution inventory and solution management, however, also pose important rate limiting considerations for heap biooxidation processes. The solution drained from the biooxidation heap will be acidic and contain bacteria and ferric ions. Therefore, this solution can be used advantageously in the agglomeration of new ore or by recycling it back to the top of the heap. However, toxic or inhibitory materials can build up in this off solution. For example, ferric ions, which are generally a useful aid in pyrite leaching, are inhibitory to bacteria growth when their concentration exceeds about 30 g/l. Biocidically active metals can also build-up in this solution, retarding the biooxidation process. Biocidically active metals that are often found in refractory sulfide ores include arsenic, antimony, cadmium, lead, mercury, and molybdenum. Other toxic metals, biooxidation byproducts, dissolved salts and bacterially produced material can also be inhibitory to the biooxidation rate. When these inhibitory materials build up in the off solution to a sufficient level, recycling of the off solution becomes detrimental to the rate at which the biooxidation process proceeds. Indeed, continued recycling of an off solution having a sufficient build-up of inhibitory materials will stop the biooxidation process altogether.

In the past, to prevent excessive build-up of inhibitory materials in the bioleachate off solution collected from the heap, mine operations have simply replaced, or diluted, the effluent from the heap with fresh inoculant solution. This is expensive as it increases the consumption of fresh water and also increases the need for waste water treatment.

A method is disclosed in U.S. Pat. No. 5,246,486, for removing inhibitory concentrations of arsenic or iron from the heap off solution, which are defined in that reference as concentrations exceeding about 14 g/l and 30 g/l, respectively. The method disclosed in this patent entails raising the pH of the bioleachate off solution to above 3 so that the arsenic ions in solution coprecipitate with ferric ions in solution. There are, however, several inadequacies with the process disclosed in this patent. First, as described above, there are a multitude of potential inhibitory materials that can be leached from the ore or that can be formed as a result of the bioleaching process; thus, simply monitoring the arsenic or ferric ion build-up in the bioleachate off solution will not alleviate the problem of inhibitory concentrations of other metals or materials from building up in the off solution. Furthermore, the off solution in most instances will not contain inhibitory concentrations of any one specific inhibitory material. Nonetheless, the biooxidation process will be retarded from the build-up of a combination of a number of inhibitory materials in the recycled off solution. Therefore, the combined concentration of at least two inhibitory materials may be sufficient to inhibit the biooxidation rate of refractory sulfide ore particles in the heap even though the concentration of no single material is above its inhibitory concentration.

Consequently, a need exists in heap biooxidation processes for a method of removing inhibitory concentrations of a group of inhibitory materials within the heap off solution. Such a method would reduce the time required for heap biooxidation processes and concomitantly reduce the capital required for constructing the heap biooxidation facility. In addition, such a method would reduce the constriction heap biooxidation typically places on mine operations.

SUMMARY OF INVENTION

It is an object of the present invention to provide a heap biooxidation process of the type described above, wherein the bioleachate off solution may be recycled with little or no reduction in the biooxidation rate of the refractory sulfide ore particles within the heap due to the build-up of an inhibitory concentration of a group of inhibitory materials within the heap off solution. To this end a heap biooxidation process is provided in which a heap of refractory sulfide ore particles is biooxidized with a bioleachate solution. The bioleachate off solution from the heap is collected. If this solution is inhibitory to the biooxidation process due to the combined concentration of a group of inhibitory materials, then the bioleachate off solution is conditioned to reduce the inhibitory effect caused by these materials. The conditioned bioleachate solution is then recycled to the top of the heap with little or no reduction in the rate of biooxidation. Alternatively, the conditioned bioleachate solution may be applied to a second heap of refractory sulfide particles or used to agglomerate particles of refractory sulfide minerals prior to heap formation.

A preferred method of conditioning the bioleachate off solution according to the present invention involves raising the pH of at least a portion of the off solution to a pH within the range of about 5.0 to 6.0, preferably to a pH within the range of about 5.5 to 6.0. This could be done continuously as a prophylactic measure, or only after it is specifically determined that the solution is inhibitory. Raising the pH of the bioleachate off solution in this fashion will typically precipitate out the inhibitory materials causing the reduction in the biooxidation rate. The solid precipitates are then separated from the bioleachate solution and the pH of the solution is lowered to an optimum pH for the biooxidation process. The conditioned bioleachate solution is then recycled to the heap or used for agglomerating new ore.

The above and other objects, features, and advantages will become apparent to those skilled in the art from the following detailed description of the invention.

DETAILED DESCRIPTION OF THE INVENTION

According to a first embodiment of the present invention, a method for improving the heap biooxidation rate of refractory sulfide ore particles that are at least partially biooxidized using a recycled bioleachate off solution is provided. The process comprises the steps of biooxidizing a heap of refractory sulfide ore particles with a bioleachate solution; collecting a bioleachate off solution that includes a plurality of inhibitory materials dissolved therein from the heap, the concentration of each individual inhibitory material in the bioleachate off solution being below its individual inhibitory concentration and the combined concentration of at least two of the inhibitory materials being sufficient to inhibit the biooxidation rate of the refractory sulfide ore particles in the ore; conditioning the bioleachate off solution to reduce the inhibitory effect caused by the combined concentration of the at least two inhibitory materials; recycling the conditioned bioleachate solution to the same heap or a second heap; and biooxidizing the refractory sulfide ore particles in the same heap or the second heap with the conditioned bioleachate solution.

The starting material upon which the present invention can operate include refractory sulfide ores and refractory carbonaceous sulfide ores. As used herein, therefore, refractory sulfide ore will be understood to also encompass refractory carbonaceous sulfide ores.

Figure 1:
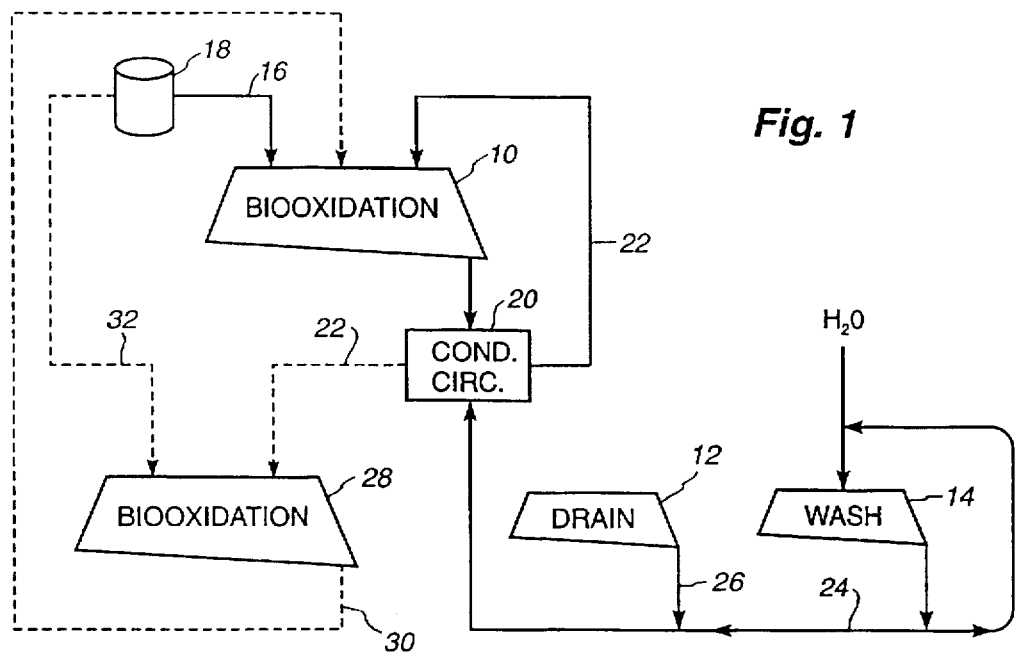
FIG. 1 is a schematic of a biooxidation process with a solution management system according to one embodiment of the present invention.

A schematic illustration of one means of practicing the present embodiment is provided in FIG. 1.

Referring to FIG. 1, heap 10 is formed of refractory sulfide particles on a reusable leach pad. After heap 10 is biooxidized by a target amount, heap 10 becomes heap 12, which is allowed to drain. Drained heap 12 then becomes wash heap 14. After heap 14 is washed, the refractory sulfide particles in heap 14 are typically removed from the permanent leach pad and the gold recovered in a heap cyanidation process as is well known in the art.

If the refractory ore being processed is a carbonaceous sulfide ore, then additional process steps may be required following microbial pretreatment to prevent preg-robbing of the aurocyanide complex or other precious metal-lixiviant complexes by the native carbonaceous matter upon treatment with a lixiviant.

One known method of heap bioleaching carbonaceous sulfide ores is disclosed in U.S. Pat. No. 5,127,942, issued Jul. 7, 1992, which is hereby incorporated by reference. According to this method, after the ore is subjected to an oxidative bioleach to oxidize the sulfide component of the ore and liberate the precious metal values, the ore is then inoculated with a bacterial consortium in the presence of nutrients to promote the growth of the bacterial consortium, the bacterial consortium being characterized by the property of deactivating the preg-robbing propensity of the carbonaceous matter in the ore. In other words, the bacterial consortium functions as a biological blanking agent. Following treatment with the microbial consortium, which deactivates the precious-metal-adsorbing carbon, the ore is then leached with an appropriate lixiviant to cause the dissolution of the precious metal in the ore as is known in the art.

The first step of the bioleaching process is to obtain refractory sulfide ore particles of an appropriate size for heap leaching. This can be accomplished by crushing the ore to the desired size range. The refractory sulfide ore is preferably crushed to a target maximum size in the range of approximately ¼ to 1 inch. Appropriate target maximum particle sizes include ¼, ⅛, ½, ¾ and 1 inch. If the ore will pass any of these target particle sizes, it should be amenable to heap leaching. The smaller the particle size, however, the greater the surface area of the sulfide particles in the ore and, of course, the faster the sulfide particles will be biooxidized. Increased recovery of the precious metal values should also result. This, however, must be weighed against the additional cost of crushing the ore to a smaller particle size. The additional amount of precious metal recovered may not justify the added cost.

In gold heap leaching, ores are often crushed to about –¾ inch, which is a good compromise between reducing rock size to minimize the required leaching time and avoiding production of too many fines, which causes low permeability in the ore heap and hinders the flow of the bioleachate solution, and subsequently the flow of cyanide solution, percolating down through the ore heap. Particle size should be selected so as to achieve the highest rate of biooxidation concomitant with the most economic crushing of the particular ore. Thus for easy-to-crush ores, the size is less, e.g., ½ inch to minus ten mesh size but for hard to crush ores from 1 to ¼ inches is more typical.

Proper ore crushing and particle size are achieved by means well known in the art.

Of course if the refractory sulfide ore body being biooxidized is already an appropriate size for heap bioleaching, no additional crushing is required.

In the event the concentration of acid consumable components of the ore, which are well known in the art, are significant or the ore contains excessive concentrations of inhibitory materials, an acid pretreatment of the ore may be necessary to properly condition the ore for biooxidation. Conditioning of the ore typically includes adjusting the pH of the ore, washing out soluble inhibitory components, and adding microbial nutrients followed by aging of the ore.

Conditioning should be initiated as soon as possible. If feasible, conditioning should begin with the ore in situ within the ore body. Subsequent conditioning should be conducted during ore hauling, crushing, agglomeration and/or stacking.

Biooxidation of refractory sulfide ores is especially sensitive to blocked percolation channels by loose clay and fine material because the bacteria need large amounts of air or oxygen to grow and biooxidize the iron sulfide particles in the ore. Air flow is also important to dissipate heat generated by the exothermic biooxidation reaction, because excessive heat can kill the growing bacteria in a large, poorly ventilated heap. Accordingly, if the ore is high in fines and loose clay material, agglomeration of the ore may be necessary to prevent flow channels in the heap from becoming plugged.

Alternatively, good fluid flow within the heap can be ensured by removing the fine and/or clay materials from the refractory sulfide ore prior to heap formation as taught in U.S. Pat. No. 5,431,717, by W. Kohr, which was previously incorporated by reference.

Initial inoculation of the refractory sulfide ore particles with biooxidizing bacteria is preferably conducted during the agglomeration step as taught in U.S. Pat. No. 5,246,486, which was incorporated by reference above, or immediately after stacking the ore on the heap.

Although other means of heap construction may be used, conveyor stacking is preferred. Conveyor stacking minimizes compaction of the ore within the heap. Other means of heap construction such as end dumping with dozer ripping or top dumping can lead to regions of reduced fluid flow within the heap.

Once heap 10 is formed, heap 10 is inoculated with additional bioleachate solution supplied from tank 18 through line 16 on an as needed basis. The bioleachate solution supplied through line 16 contains at least one microorganism capable of biooxidizing the refractory sulfide ore particles in heap 10.

A microbial nutrient solution is also applied to heap 10 as required. Nutrient additions are monitored throughout the course of the biooxidation process and are made based on selected performance indicators such as the solubilization rate of arsenic or iron in the pyrites or the oxidation rate of sulfides, which can be calculated therefrom. Other bicoxidation performance indicators that may be used include measuring pH, titratable acidity, and solution Eh.

The following bacteria may be used in the practice of the present invention:

Group A. *Thiobacillus ferrooxidans; Thiobacillus thiooxidans; Thiobacillus organoparus; Thiobacillus acidophilus;*

Group B. *Leptospirillum ferrooxidans;*

Group C. *Sulfobacillus thermosulfidooxidans;*

Group D. *Sulfolobus acidocaldarius; Sulfolobus BC; Sulfolobus solfataricus* and *Acidianus brierleyi* and the like.

These bacteria are either available from American Type Culture Collection or like culture collections or have been made available thereto and/or will be made available to the public before the issuance of this disclosure as a patent.

The Group A and B bacteria are mesophiles, that is the bacteria are capable of growth at mid-range temperatures (e.g., about 30° C.). Group C consists of facultative thermophiles because the bacteria are capable of growth in temperature range of about 50° C. to 55° C. Finally, the Group D bacteria are obligate thermophiles, which can only grow at high (thermophilic) temperatures (e.g., greater than about 50° C.).

It should be noted that the for Group A and B bacteria to remain useful, the temperature of the heap should not exceed about 35° C.; for Group C bacteria the temperature of the heap should not exceed about 55° C.; and for Group D bacteria, the temperature of the heap should not exceed about 80° C.

As is well known in the art, the temperature in a bioleached heap is not uniform and the bacteria are often unable to survive if the temperature is improperly controlled or if the appropriate bacteria are not used. Consequently, based on a temperature profile of the heap when oxidation of the refractory sulfide ore particles is in its most advanced stage and the sulfide oxidation exotherm is the highest, the heap may be bathed with cooled bioleachant, cooled, recycled bioleachant, or a cooled maintenance solution, i.e., a nutrient solution. In addition the heap may be constructed with cooling (and/or heating) provisions. Moreover, the heap may be inoculated with the appropriate bacteria to meet the temperature limits of the ore. Thus, if the ore is a high sulfide content ore, a thermophilic bacteria should preferably be used.

After the biooxidation reaction has reached an economically defined end point, the heap may then be drained and subsequently washed by repeated flushings with water. The number of wash cycles required are typically determined by a suitable marker element such as iron and the pH of the wash effluent. After wash heap 14 is properly flushed, it is broken apart, neutralized, and treated in a traditional cyanidation heap leaching process as is well known in the art.

Solution inventory and solution management are an important part of the biooxidation process. FIG. 1 illustrates a solution management system according to one embodiment of the present invention for the entire biooxidation, drainage, and wash sequence. From FIG. 1, it can be seen that according to this embodiment all of the solution values are reutilized. This minimizes the amount of fresh water required by the biooxidation process.

According to FIG. 1, the bioleachate solution that has percolated through heap 10 is collected and reapplied to the top of heap 10. This solution is acidic and contains ferric ion and therefore can be used advantageously by recycling it to the top of the heap or by using it for agglomeration of new ore. However, the effluent solution generated early in the biooxidation process will also contain significant concentrations of base and heavy metals, including the components that lead to microbial inhibition. As the inhibitory materials build-up in the off solution, the biooxidation process is retarded.

For example, ferric ions, which are generally a useful aid in pyrite leaching, are inhibitory to bacteria growth when their concentration exceeds about 30 g/l. Biocidically active metals can also build-up in this solution, retarding the biooxidation process. Biocidically active metals that are often found in refractory sulfide ores include arsenic, antimony, cadmium, lead, mercury, molybdenum and silver. Other inhibitory metals (including copper and aluminum), biooxidation byproducts, dissolved salts and bacterially produced material can also be inhibitory to the biooxidation rate. Anions such as $Cl^-$, $NO_3^-$, and $[SO_4]^{2-}$ may also need to be reduced before the solution is recycled back to the heap. When these inhibitory materials build-up in the off solution to a sufficient level, recycling of the off solution becomes detrimental to the rate at which the biooxidation process proceeds. Indeed, continued recycling of an off solution having a sufficient build-up of inhibitory materials will stop the biooxidation process altogether.

Further, the normal pH adjustment of the bioleachate off solution to the optimal pH range for bioleaching is inadequate to remove the inhibitory materials from solution. Thus, if the pH of the off solution is merely adjusted to the optimal range before recycling the solution to the top of the heap, the biooxidation rate will remain suppressed.

Nor is simply monitoring the arsenic or ferric ion build-up in the bioleachate off solution and then treating the off solution when one of these compounds are present in excessive concentrations adequate to alleviate the problem of inhibitory concentrations of other metals or materials from building up in the off solution. More importantly, the off solution in most instances will not contain inhibitory concentrations of any one specific inhibitory material. But, rather the biooxidation process will be retarded from the build-up of a combination of a number of inhibitory materials in the recycled off solution. Therefore, in most instances, the combined concentration of at least two inhibitory materials will be sufficient to inhibit the biooxidation rate of refractory sulfide ore particles in the heap. Indeed, typically, the biooxidation rate of the bioleachate off solution will be inhibited due to the combined concentration of a group of inhibitory materials long before the concentration of any one inhibitory material in the group even approaches its inhibitory concentration.

As is well known in the art, different bacteria, and different strains of the same bacteria, have varying sensitivities to the inhibitory materials. Thus, the inhibitory concentration of individual inhibitory materials will vary with different bacteria and with different strains of the same bacteria. Indeed some strains will be highly resistant to a metal while others are highly sensitive to it. For this reason, it is useful to test the bacteria being used in a biooxidation process for their sensitivity to metals in the ore and in the effluent or off solution.

To determine the individual inhibitory concentration of a specific bacteria inoculant, as illustrated in Example 1 below, a simple biooxidation test can be performed using a bioleachate solution containing a known concentration of the inhibitory material, preferably in the sulfate form, and a known concentration of bacteria. The concentration of the inhibitory material is then increased in a stepwise fashion until an inhibitory effect in the biooxidation rate of the bioleachate is observed. The point at which an inhibitory effect is observed is the inhibitory concentration for the material. Whether an inhibitory effect is observed is determined by comparing the sample to a positive control.

According to the present invention, the bioleachate off solution is treated in a conditioning circuit 20 to reduce the inhibitory effect caused by the combined concentration of a group of inhibitory materials before any one specific inhibitory material in the group reaches its inhibitory concentration. Treatment options for conditioning the bioleachate off solution include lime softening, limestone softening, ion exchange, electrodeposition, iron cementation, reverse osmosis or a combination of these technologies. In some instances, the concentration of an inhibitory metal may be sufficiently high to justify economic recovery of the metal values. For example, if the concentration of copper is sufficiently high in the bioleachate off solution, solvent extraction or electrowinning might be employed to recover this metal.

The preferred method of conditioning the bioleachate off solution according to the present invention is lime or limestone softening. This is accomplished by using lime or limestone to raise the pH of the bioleachate off solution to pH of at least 5.0, preferably to a pH within the range of about 5.0 to 6.0, and most preferably to a pH within the range of about 5.5 to 6.0. The resulting precipitates are then removed from the bioleachate off solution. After the precipitates are removed, the pH of the solution is lowered back to the optimal range of 1.2 to 2.6 for biooxidation using concentrated acid or using acid in the wash water 24 and/or drain solution 26. More preferably the pH of the solution is lowered to the range of 1.7 to 1.9, and most preferably the pH is lowered to a pH of about 1.8. Although lime or limestone is the preferred means of raising the pH to greater than 5.0, other strong bases can also be used as one of ordinary skill in the art would recognize.

If the treated bioleachate off solution remains too inhibitory after having undergone lime or limestone softening, then the off solution may require further purification by one of the other conditioning techniques listed above. Whether another conditioning technique is employed will depend on whether the incremental improvement in the biooxidation rate, which is achieved by the removal of the additional inhibitory materials, is justified by the added cost of removing the inhibitory materials.

Once the pH of the bioleachate off solution is readjusted to the appropriate pH for biooxidation, conditioning of the bioleachate off solution is complete and the conditioned solution 22 may be reapplied to the top of heap 10 to promote additional biooxidation within the heap. Moreover, the biooxidation rate will be higher than that for unconditioned recycled bioleachate off solution, and in some instances greater than that by a fresh solution. Alternatively, the conditioned bioleachate solution may also be used to agglomerate ore as it is being placed on the heap.

As ferric ions promote the biooxidation process, it would be beneficial to include from about 5 to 20 g/l ferric ion in the conditioned solution 22. One potential source for ferric ion is the bioleachate off solution coming off heap 10. Prior to conditioning, the bioleachate off solution from heap 10 will typically have a high ferric ion concentration.

In a variation to the present embodiment, conditioning circuit 20 is broken down into a preliminary softening step and a final softening step. This two step precipitation process permits the recovery of ferric ions from the off solution for subsequent addition to conditioned solution 22. Thus, in the present variation, instead of raising the pH of the bioleachate off solution to at least 5.0, an intermediate pH adjustment is first performed in which the pH of the bioleachate off solution is adjusted to the range of approximately 3.0 to 4.0. Within this range, most of the ferric ion in solution should precipitate while at the same time minimizing, to the greatest extent possible, the amount of inhibitory metals and other materials precipitated from the off solution. The amount of inhibitory materials precipitated during the preliminary softening step is minimized because many of the inhibitory materials found in the off solution will not precipitate unless the pH of the off solution is adjusted to a pH greater than at least 5.0.

Once the pH of the bioleachate off solution is adjusted to the range of 3.0 to 4.0, any precipitate that forms is separated from the aqueous off solution. This precipitate will have a high concentration of precipitated ferric ion and can be redissolved in conditioned bioleachate solution 22. After removing the precipitate formed during the preliminary softening step, the off solution is subjected to a final softening step in which the pH of the solution is raised as described above to a pH of at least 5.0, and preferably to a pH of approximately 5.5 to 6.0 to precipitate out the bulk of the remaining inhibitory components in the off solution. The newly formed precipitates are then removed and the pH of the solution is lowered back to the optimal range of 1.2 to 2.6 for biooxidation. More preferably the pH of the solution is lowered back to the range of approximately 1.7 to 1.9. Conditioning of the bioleachate off solution is now complete.

The ferric ion concentration of the conditioned off solution is now ready to be adjusted to the preferred range of 5 to 20 g/l using an appropriate amount of the ferric ion precipitate that was formed during the preliminary softening step. The conditioned off solution is now ready to be added to heap 10 or used to agglomerate ore as it is being placed on a heap.

It is economically preferred for the flow rate of the bioleachate solution through the ore to be as slow as possible. In the case of ores that require purification or conditioning of the effluent solution before it can be reapplied, the preferred flow rate of the bioleachate through the heap is from 0.0005 to 0.003 gpm/ft$^2$. If the bioleachate solution applied to the heap contains from about 5 to 20 g/l ferric ion, then the flow rate of the bioleachate through the heap can be increased up to approximately 0.01 gpm/ft$^2$. In the case of ores that produce toxic materials while being leached, the movement of fresh or purified solution through the heap will allow for the growth of bacteria at least in the upper part of the heap. The bacteria will grow in the heap as fast as the elution of the toxic materials will allow. This depth of bacterial penetration may vary, and may be difficult to determine. However, ferric ions produced by the bacteria in the upper section of the heap, or that are added to the bioleachate solution before applying to the heap, will migrate to the lower part of the heap where bacterial growth may be inhibited. This will allow biooxidation to proceed even if bacterial growth is not favored. By this method, ore that contains toxic elements or that produces any toxic material as they oxidize can be biooxidized in a heap by recirculating detoxified solution back to the top of the heap, rather than simply reusing the drain solution without treatment.

Based on the teachings herein, in many instances, those skilled in the art will recognize from the ore assay alone that the refractory sulfide ore they are processing poses a problem with respect to the build-up of a combination of inhibitory materials in the bioleachate off solution. Based on this knowledge, a decision will be made to simply treat the bioleachate off solution on a continuous basis in a lime or limestone softening circuit of the type discussed above before recycling the bioleachate solution. Alternatively, those skilled in the art may decide to treat the bioleachate solution after every pass through the heap in the lime or limestone softening circuit simply as a prophylactic measure. Both of these processes would fall within the teachings of the present invention.

The present invention also contemplates processes in which conditioning of the bioleachate off solution is performed in response to an affirmative determination that the off solution is inhibitory to the biooxidation process.

Those skilled in the art will immediately recognize that there are a number of techniques that can be employed for determining whether the bioleachate off solution is inhibitory. Many of the techniques may not specifically determine the concentration of individual inhibitory materials. Indeed, it is preferred that techniques be employed which simply look at whether biooxidation in the solution is impaired as compared to a positive control. This is because the concentration of inhibitory materials found in a bioleachate off solution will change continuously depending on such factors as where in the ore body the ore was obtained and how far the biooxidation process has progressed. Therefore, it would be very difficult, if not impossible, to attempt to determine whether a particular combination of inhibitory materials at a given concentration is inhibitory simply by looking at the concentrations of the inhibitory materials in the off solution.

On the other hand, by comparing the performance of the off solution to a positive control, it can be easily determined whether the combined concentration of inhibitory materials in the off solution is inhibitory.

Further, such testing need not be performed on a continuous basis. Rather, during column or pilot testing of the ore, the typical length of time that inhibitory concentrations of toxins or inhibitory materials are leached out of the ore can be determined. With this knowledge, those skilled in the art can readily determine how long the biooxidation process must proceed before the bioleachate off solution can be safely recycled without conditioning to remove inhibitory materials.

Preferably, however, the toxicity of the bioleachate off solution to the biooxidation microorganism is tested on a continuous basis. In this way, it can be determined whether the bioleachate off solution is inhibitory, the extent it inhibits the biooxidation process, and which treatment methods most adequately remove the inhibition. The following two assay techniques are preferred for determining solution toxicity to the biooxidation microorganism.

The first, a spectrophotometric activity assay is based on the absorbance of ferric iron (Fe$^{3+}$) at 304 nm. This procedure is a modification of the method described by Steiner and Lazaroff, *Applied Microbiology*, 28:872–880, 1974, hereby incorporated by reference, to determine the concentration of ferric ion in a solution. According to this assay, samples containing a known number of bacteria, the test solution, and ferrous sulfate are monitored over time (usually 5–20 minutes) by measuring their absorbance at 304 nm. These absorbances are compared over time to a standard curve relating absorbance and ferric iron concentration. As a result, a curve is obtained that describes the rate of iron oxidation by the bacteria. The iron oxidation rates of bacteria in different solutions can then be compared directly, thus giving an indication of the ability of a solution to inhibit this activity. Solutions which slow the rate of iron oxidation by bacteria are regarded as toxic or inhibitory.

A microtiter plate assay is the second preferred method for measuring the toxicity of the bioleachate off solution. The spectrophotometric assay is very sensitive to ferric concentration. It only has a working concentration range of about 0.1–1000 ppm ferric iron. For samples with high ferric iron concentrations, the microtiter plate assay was developed. As in the previous assay, the test samples include a known number of bacteria, test solution, and ferrous sulfate. In this assay, however, the redox potential (Eh) of the sample is measured over time (usually 24–48 hours). The redox potential is a measure of the ratio of ferric to ferrous iron in solution, with higher redox potentials indicating a high percentage of ferric iron. By knowing the percentage of ferrous iron in the starting material, the percentage of ferrous iron at the end of the assay, and the total amount of iron (combined ferrous and ferric), the milligrams of ferrous iron converted to ferric iron can be calculated. The activities of the bacteria in different solutions are compared to a positive control on the basis of the milligrams of ferrous iron converted to ferric iron by the end of the assay, which is when all of the ferrous iron is converted to ferric iron in the positive control sample.

One advantage of the spectrophotometric and microtiter assays is that they permit the rapid determination of the toxicity of specific substances.

Using these assays, two types of toxicities to bacteria have been observed. They are referred to as "chronic" and "acute". "Acute" toxicity describes the inhibition of ferrous to ferric oxidation while the bacteria are in the off solution; "chronic" toxicity describes the ability of an off solution to inhibit bacterial oxidation by bacteria which have been removed from the solution, washed, and placed into a fresh ferrous sulfate medium. The spectrophotometric assay can be used to test the "chronic" toxicity of solutions, and the "acute" toxicity of solutions which do not contain large quantities of ferric iron (i.e., solutions containing <1000 ppm $Fe^{3+}$). The microtiter assay can be used to measure both the "acute" and "chronic" toxicities of solutions.

These assays also can be used in combination, to test the "chronic" and "acute" toxicities of a solution. The microtiter plate assay is run first, for 24–48 hours, during which time the bacterial iron oxidation in solution is measured ("acute" toxicity test). Then, the bacteria are removed from the assay plate, pelleted, washed, and resuspended in a ferrous sulfate solution. This suspension is monitored at 304 nm for an increase in ferric iron over time ("chronic" toxicity test). By combining these two assays, the ability of a solution to produce an immediate and/or long-lasting toxicity can be determined.

In a preferred variation of the present embodiment, instead of conditioning the entire volume of off solution, only a portion of the off solution is treated to remove inhibitory materials. The conditioned portion is then recombined with the unconditioned portion to dilute the inhibitory materials therein before recirculation. This variation is particularly preferred when using lime or limestone softening as the method of conditioning since less lime or limestone is required. After the precipitates have been removed from the conditioned off solution, the unconditioned portion of the off solution can be used to lower the pH of the conditioned portion back to the optimum range for biooxidation.

Preferably about 70% to 85%, more preferably about 70% to 80% of the bioleachate off solution is conditioned by lime or limestone softening. In this way, approximately the same amount of lime or limestone is required to raise the pH of the treated volume of solution to the preferred conditioning pH range of 5.5 to 6.0 as is required to raise the pH of the entire bioleachate off solution to the preferred biooxidation pH of about 1.7 to 1.9. This is due to the buffering capacity of the bioleachate solution. Thus, when the treated and untreated portions are recombined, the final pH of the entire conditioned bioleachate off solution should fall within the optimum range of about 1.7 to 1.9 for biooxidation. If not, minor adjustments can be made using concentrated acid or acid from the drain and wash circuit.

Even though only 70 to 85% of the off solution is actually treated in this variation, sufficient inhibitory materials are removed from this portion of the off solution so that when it is recombined with the remaining 15 to 30% of untreated off solution, the biooxidation rate of the entire conditioned off solution is improved substantially. Thus, this variation has the advantage of removing a substantial portion of the inhibitory materials from the bioleachate off solution, while using about the same amount of lime or limestone as is required to adjust the pH of the entire off solution back to the optimal range for biooxidation.

Instead of applying the conditioned bioleachate solution 22 to the top of heap 10, it can alternatively be applied to the top of heap 28. And, in order to maintain an appropriate level of activity within heap 28, bioleachate solution from tank 18 may be added on an as needed basis through line 32 to supplement the applications of conditioned bioleachate solution 22 from heap 10.

Heap 28, like heap 10, is a heap of refractory sulfide ore particles. However, compared to heap 10, heap 28 is in a more advanced stage of biooxidation. Because heap 28 is in advanced stage of biooxidation, the majority of inhibitory materials have already been washed from heap 28. Thus, the effluent from this heap will be high in acidity (pH of about 1), high in ferric ion concentration, and low in inhibitory components. The bioleachate off solution 30 from heap 28, therefore, may be advantageously applied to heap 10, which is early in the biooxidation process, as the high ferric ion concentration and acidity coupled with the low levels of inhibitory components will accelerate the initiation of biooxidation. Similarly, the conditioned bioleachate off solution 22 from heap 10 can be applied to the more fully biooxidized ore in heap 28. As the more fully biooxidized ore in heap 28 is very acidic, the applied bioleachate solution should not be as acidic as when applied to an ore that is less fully biooxidized. Further, because heap 28 contains less toxins, the rate of application of the bioleachate solution to this heap can be reduced.

Preferably the pH of the on solution applied to heap 28 is in the range of about 2 to 3, instead of 1.7 to 1.9. Thus, less acid is required to lower the pH of the bioleachate off solution from heap 10 to the optimal biooxidation range for heap 28 after it goes through lime or limestone softening in conditioning circuit 20. This means that a larger percentage of the off solution may be treated in the lime or limestone conditioning process.

To reiterate, the effluent acidity, ferric ion content and inhibitory material content from different biooxidation heaps (corresponding to ores that have been biooxidized to different extents) will be different. Any effluent that is high in the combined concentration of inhibitory materials should be treated to remove the inhibitory components. Applied solutions to the different heaps should be formed from mixtures of the available effluent solutions. Optimal mixtures can be made such that the solution applied to a heap early in the biooxidation process is high in ferric ion content, high in acidity and low in inhibitory components. Solutions applied to more fully biooxidized heaps can be lower in acidity. By using these optimal mixtures, initiation of biooxidation should occur more quickly, and the amount of required neutralization should be less with a corresponding reduction in neutralization associated costs. In addition, acid additions will be minimized.

Ores having a high natural carbonate level may require an excessive amount of acid to condition the ore to the desired pH level for biooxidation. Waste generated acid from drain heap 12 or biooxidation heap 28 is preferably used in such circumstances to condition this ore. Waste acid should be used to the extent possible to lower the pH of the ore so as to minimize the neutralization requirements of the bioleachate off solution.

The solution management system described in connection with FIG. 1 can also be used in conjunction with the "race track" heap biooxidation process illustrated in FIG. 2. Using the "race track" heap of FIG. 2 permits the present invention to be practiced in a more restricted area when available space for biooxidation is limited.

Figure 2:
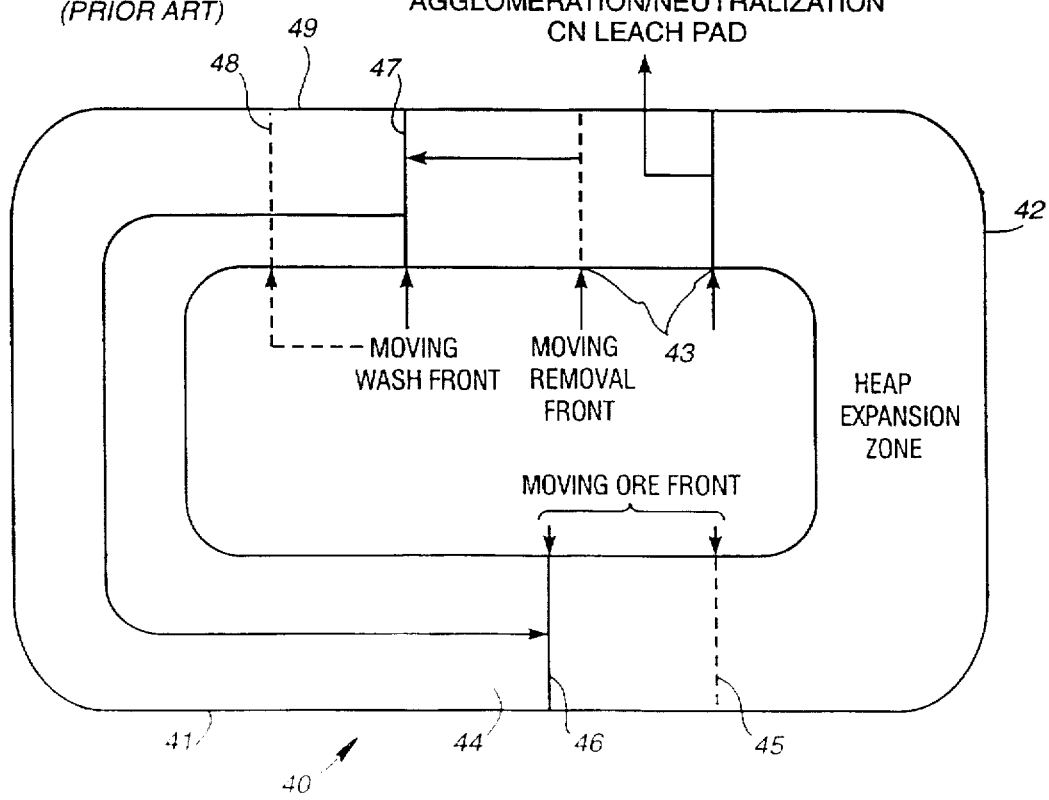
FIG. 2 is a schematic of prior art "race track" type biooxidation process that can be used with the solution management system according the present invention.

According to FIG. 2 a circular "race track" type heap 40 is constantly being formed and reformed. Thus the heap expansion zone 42, which represents the empty surface area is gradually moving around the circle formed by the "race track" heap 40. As new layers of ore 44 are being added at face 46, the agglomerated and preferably inoculated refractory sulfide particles approach the new face 45 of the freshly inoculated ore 44. From a similarly moving removal front 43, the ore is taken away to a cyanide leach heap as is known in the art. Likewise a moving wash front 47 and its corresponding new wash front 48 illustrate the moving wash section 49 being treated to reduce acidity of the biooxidized ore in the "race track" heap 40. Biooxidation in heap 40 occurs in the biooxidation zone 41 between the moving wash front and the moving ore front.

In the examples below various aspects of the invention are further amplified and are intended as illustrations, but not limitations, of the invention disclosed herein.

EXAMPLE 1

The *Thiobacillus ferrooxidans* strain used in the present example was initially started from a culture consisting of a consortium of ATCC 14119, ATCC 19859, ATCC 23270, and ATCC 33020. However, the culture presently used by the inventor is no longer pure. Over time, this culture has become contaminated with wild strains. A deposit of this culture was made on Oct. 25, 1995, with the ATCC. The inventors are presently awaiting the assignment of an ATCC number, which will be provided upon receipt.

The present experiment was conducted to test the sensitivity of the modified strain of *T. ferrooxidans* to individual metals found in the effluent from a column containing refractory sulfide ore particles from a Gilt Edge Mine ore sample, which is located in South Dakota. The bioleachate effluent or off solution as a whole was found to be inhibitory to the biooxidation process.

The Gilt Edge Mine ore sample within the biooxidation column consisted of 8 Kg of $-\frac{3}{8}$ inch ore. An inductively coupled plasma emission spectroscopy ("ICP") analysis of the bioleachate effluent solution from this ore was conducted to determine the concentration of the inhibitory metals therein. Individual assays were then prepared with metal concentrations identical to or slightly greater than those determined by the ICP analysis of the effluent. The metals were added to the assays as metal salts, primarily as sulfate salts. The individual metals were then tested for their ability to inhibit the oxidation of ferrous sulfate by the *T. ferrooxidans*. To determine whether there was any inhibitory effect observed as a result of the concentration of the individual metal, each assay was compared against a positive control.

Table 1 below lists the metals found to be present in the effluent, the concentration of each metal in the effluent and in the individual assays, and whether an inhibitory effect was observed in the assay.

TABLE 1

| METAL | ICP CONC. | ASSAY CONC. | TOXICITY |
|---|---|---|---|
| Al (in HCl) | 290 ppm | 300 ppm | yes |
| As | 8–12 ppm | 15 ppm | no |
| Cd | 2.3 ppm | 5 ppm | no |
| Co | 1.5 ppm | 2 ppm | no |
| $Cr(Cr_2O_7/H_2O)$ | 0.4 ppm | 1 ppm | no |
| Cu (as $SO_4$) | 680 ppm | 700 ppm | no |
| Mn | 17 ppm | 20 ppm | Possibly |
| Ni | 0.9 ppm | 1 ppm | no |
| Sr | 3.6 ppm | 5 ppm | no |
| Zn (in HCl) | 44 ppm | 45 ppm | yes |

Based on these results, further tests were run for aluminum and zinc in order to determine minimum toxic levels for these metals. In addition, tellurium, molybdenum, and copper were tested to determine the minimum concentration at which these metals inhibit the biooxidation process. With regard to aluminum and zinc, the sulfate salts of these metals were used for this test instead of the chloride salts. In these tests, no inhibitory effect was observed up to the maximum concentration tested, which was 5000 ppm for aluminum and 2000 ppm for zinc.

The chlorine salts of these—and other metals—showed slight inhibition of iron oxidation at 0.2% Cl, which increased to full toxicity at about 1% chloride ion. Thus, the inhibitory effect observed for aluminum and zinc in the first test was due to the chloride ion and not an inhibitory effect due to the metals themselves.

The inhibitory effect observed in the manganese assay was determined to be the result of an unknown artifact. This was concluded from the fact that when the original effluent was conditioned by increasing its pH to within the range of 5.0 to 6.0 the conditioned solution showed no inhibitory effect after readjustment of the pH for biooxidation. Indeed, the conditioned effluent performed as good or better than the positive control. Yet, solubilized manganese is a very difficult metal to leach from the effluent. In fact, raising the pH of the effluent to a pH of 6.0 will not precipitate manganese from the bioleachate solution. Thus, while the conditioned effluent still contained the same amount of manganese as it did before conditioning, after conditioning the effluent was no longer inhibitory. This means that an artifact of some sort caused the manganese assay to exhibit a minimal level of inhibition, and the inhibition was not due to the manganese itself. Subsequent testing has indicated that the inhibitory effect observed in the manganese solution was due to the $NO_3^-$ counter-ion in the solution used, and not the manganese ion itself.

In sum, while the effluent solution from the Gilt Edge Mine ore was inhibitory to the biooxidation process, the concentration of no individual metal contained within the solution was inhibitory.

A summary of the individual metal toxicity tests done after the initial screen are contained within Table 2.

TABLE 2

| METAL | HIGHEST CONC. TESTED | TOXICITY |
|---|---|---|
| Al (as $SO_4$) | 5000 ppm | none |
| Zn (as $SO_4$) | 2000 ppm | none |
| Te (as $TeO_3$) | 500 ppm | none |
| Mo (as $MoO_4$) | 500 ppm | $\geq 50$ ppm |
| Cu (as $SO_4$) | 5000 ppm | none |

As seen from Table 2, Mo inhibited the rate of biooxidation of the modified strain of *T. ferrooxidans* when its concentration reached $\geq 50$ ppm in the test solutions.

In addition to the metals listed in Table 2, the inhibitory effect of sodium was also tested using solutions containing various concentrations of $Na_2SO_4$. As a result of these tests, it was determined that Na was not toxic to the modified strain of *T. ferrooxidans* up to a concentration of about 1.2 M (Na).

EXAMPLE 2

Two samples of ore from the Gilt Edge Mine in South Dakota were prepared for a bioleach shake flask test. The two samples of ore were ground for 20 minutes in a ball mill. One sample was mixed with xanthate and floated in a laboratory flotation cell to form a pyrite concentrate. A portion of the pyrite concentrate was used to grow and acclimate a laboratory mixed culture of *Thiobacillus ferrooxidans* bacteria to this ore. The ore was inoculated with $5 \times 10^8$ cells/ml in 0.5 strength 9K salts medium at a pH 2.2 and a pulp density of approximately 10% (5 g/50 ml.). The slightly higher pH was used to obtain better cell growth.

The composition of the standard 9K salts medium for *T. ferrooxidans* is listed below. The concentrations are provided in grams/liter. After the medium was prepared, the pH of the medium was adjusted to 2.2 using $H_2SO_4$.

| | |
|---|---|
| $(NH_4)_2SO_4$ | 5 |
| KCl | 0.17 |
| $K_2HPO_4$ | 0.083 |
| $MgSO_4.7H_2O$ | 0.833 |
| $Ca(NO_3)_2.4H_2O$ | 0.024 |

After 13 days of shaking at 250 rpm at 30° C, the bacteria solution was split into two fractions. One fraction was used to inoculate the whole ore sample that had been ground but not floated. The other fraction was used to inoculate the pyrite float concentrate. The pulp densities were 25% (250 g/1000 ml) for the whole ore and 10% (70 g/630 ml) for the pyrite concentrate. The starting pH was 1.9 for each sample and the starting Eh was approximately 460 mV for each. The samples were shaken at 250 rpm and kept at 30° C. Prior to inoculation, a small sample of each was sent out for metal analysis. The percentages of both iron and copper were used to calculate the total amount of iron and copper in each experiment.

As the digestion proceeded, a small volume of liquid was removed and analyzed for soluble iron and copper. This was used to determine the total amount of iron and copper in solution. The total amount of iron and copper in solution was then used to calculate the percentage of each metal leached as the reaction proceeded. The time in days that these samples were taken as well as the iron and copper levels in ppm and percentage leached and the Eh and pH are listed in Table 3.

Figure 3:
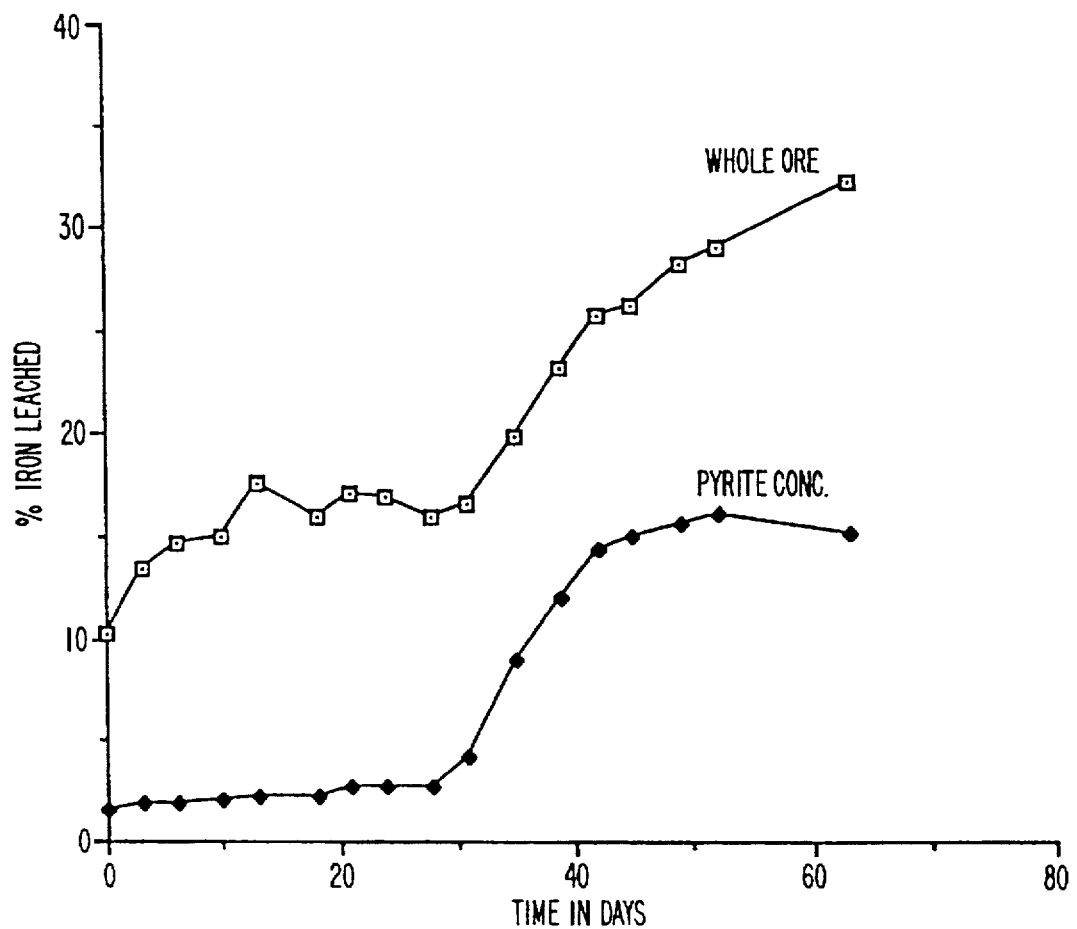
FIG. 3 is a graph of the % iron leached from an ore as a function of time.
Figure 4:
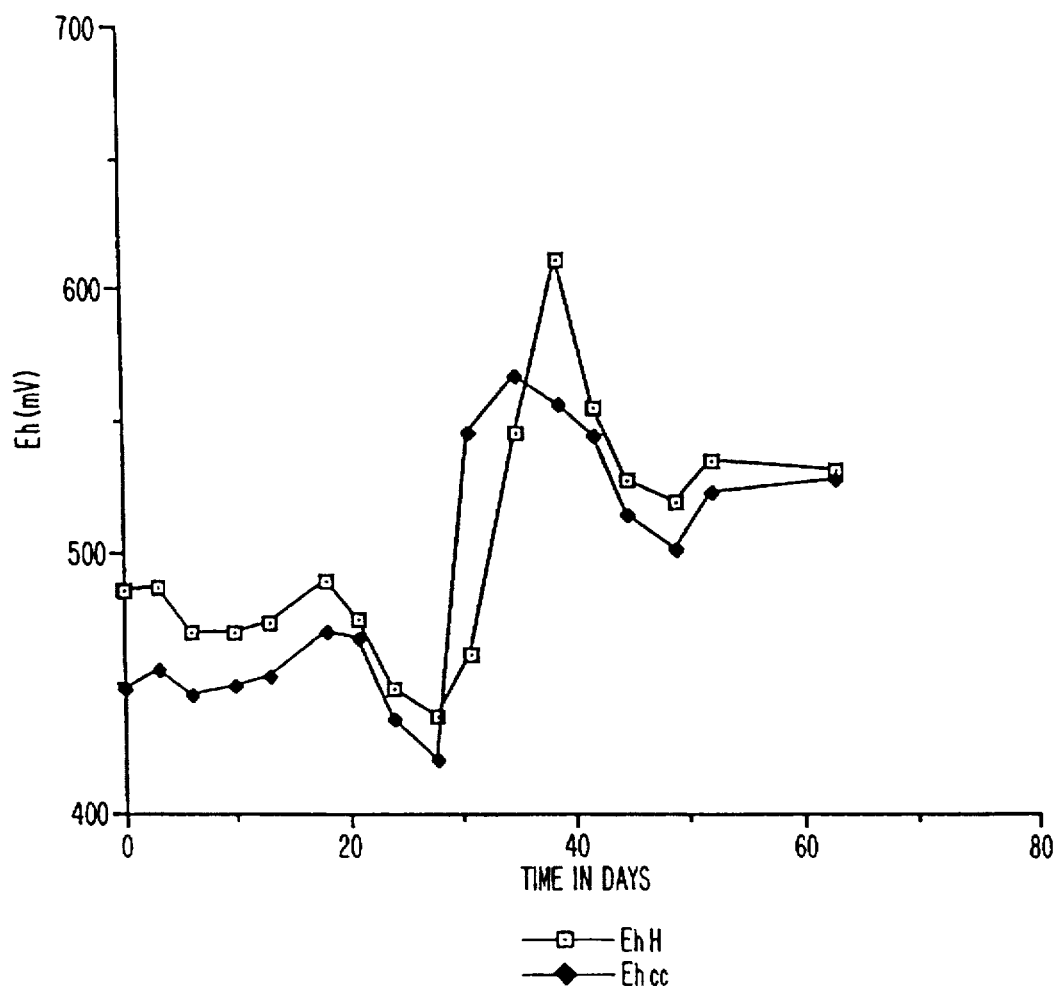
FIG. 4 is a graph of the Eh of a bioleachate off solution from a refractory sulfide ore and a corresponding concentrate of the sulfides from the ore as a function of time.

On day 28, both samples of ore were left to settle out to provide a supernatant that could be removed. The removed solution was replaced with new 0.5 strength 9K salts at a pH of about 1.8. The biooxidation continued with the fresh solution. Shortly after the removal of this solution, which was high in inhibitory metals, the Eh and rate of leaching increased. This effect can be graphically seen in FIGS. 3 and 4, which were prepared from the data in Table 3.

After several weeks, the Eh and the rate of iron leaching again slowed down. This indicated that toxic or inhibitory elements were again leached out into the bioleachate solution, and that the removal of these elements were important for the rapid biooxidation of this or similar ores.

TABLE 3

| | DAYS | % Fe LEACHED/H | % Fe | % Cu LEACHED/H | % Cu | Eh H | Eh cc |
|---|---|---|---|---|---|---|---|
| 1 | 0 | 10.230 | 1.590 | 64.190 | 39.890 | 485 | 448 |
| 2 | 3 | 13.520 | 1.860 | 72.140 | 55.540 | 486 | 455 |
| 3 | 6 | 14.770 | 1.940 | 80.060 | 66.100 | 470 | 445 |
| 4 | 10 | 15.090 | 2.130 | 93.130 | 76.740 | 469 | 449 |
| 5 | 13 | 17.610 | 2.230 | 102.350 | 81.800 | 473 | 453 |
| 6 | 18 | 16.000 | 2.280 | 101.310 | 81.810 | 489 | 469 |
| 7 | 21 | 17.060 | 2.680 | 104.510 | 85.880 | 474 | 467 |
| 8 | 24 | 16.960 | 2.710 | 103.790 | 84.090 | 448 | 436 |
| 9 | 28 | 16.050 | 2.720 | 101.080 | 85.410 | 437 | 420 |
| 10 | 31 | 16.660 | 4.150 | 102.020 | 85.550 | 461 | 545 |
| 11 | 35 | 19.830 | 8.970 | 104.820 | 86.740 | 545 | 567 |
| 12 | 39 | 23.240 | 11.96 | 104.850 | 87.170 | 611 | 556 |
| 13 | 42 | 25.770 | 14.46 | 106.080 | 87.710 | 555 | 544 |
| 14 | 45 | 26.290 | 15.10 | | | 527 | 514 |
| 15 | 49 | 28.300 | 15.71 | | | 519 | 501 |

TABLE 3-continued

| | DAYS | % Fe LEACHED/H | % Fe | % Cu LEACHED/H | % Cu | Eh H | Eh cc |
|---|---|---|---|---|---|---|---|
| 16 | 52 | 29.110 | 16.19 | | | 535 | 522 |
| 17 | 63 | 32.310 | 15.27 | 107.020 | 88.740 | 531 | 527 |

% Fe leached/H = % Fe leached from the wholeore
% Fe = % Fe leached from the concentrate
% Cu leached/H = % Cu leached from the whole ore
% Cu = Cu leached from the concentrate
Eh H = The Eh of the solution coming of the whole ore sample.
Eh cc = The Eh of the solution coming from the pyrite concentrate sample.

EXAMPLE 3

A second test was conducted with the ore used in Example 2 to simulate a heap biooxidation process. The sample provided by the Dakota Mining Corporation from the Gilt Edge Mine was crushed to minus ¼ inch material. In order to achieve good air flow, the fine material (passing 30 mesh screen) was removed, which accounted for about 20% by weight of this 16 kg sample. A 7.8 Kg sample of the +30 mesh ore was mixed with sulfuric acid and 0.5 strength 9K salts to wet the ore and lower the pH below 2.0. The wet ore was placed into a 3 inch by 6 ft. column. Air was introduced into the bottom and liquid (0.2 strength 9K salts, pH 1.8) and bacteria (~$10^7$ cell/g of ore) were applied to the top of the column. The solution coming off the bottom of the column was analyzed for iron and copper, and the concentration of these metals in the solution samples removed from the column were used to calculate the total percentage of iron and copper leached.

Figure 5:
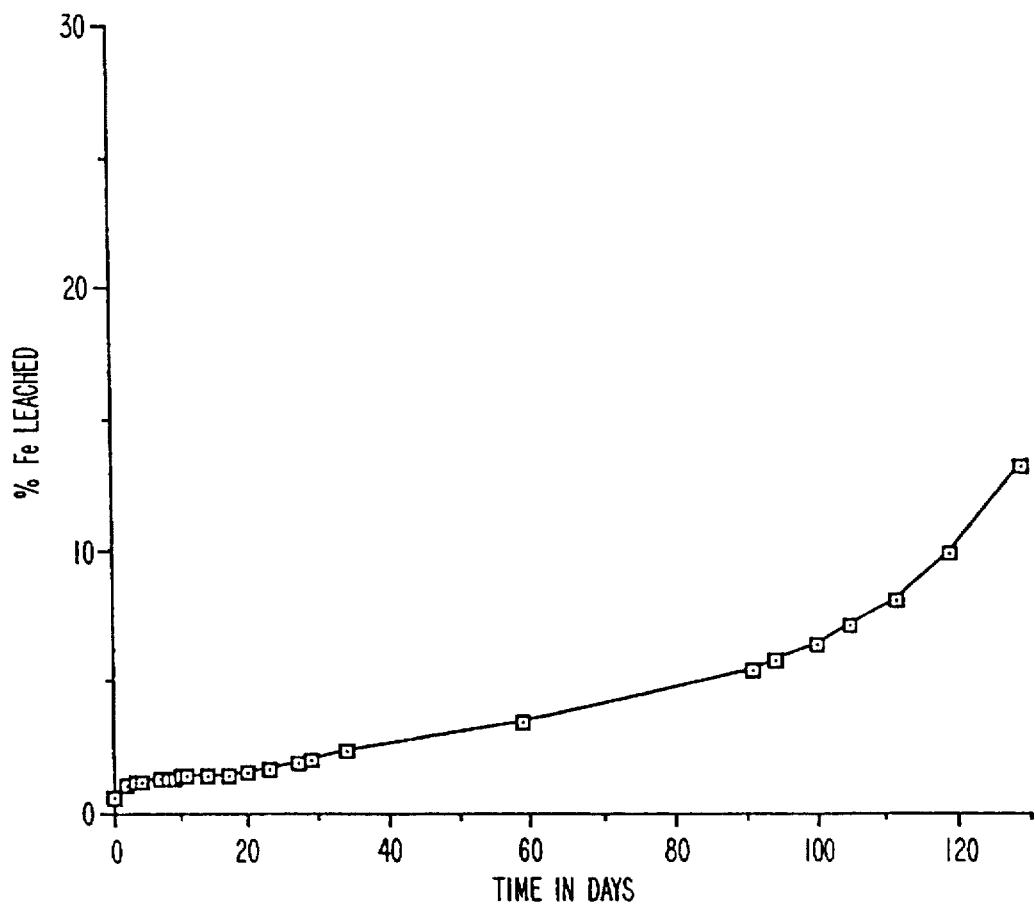
FIG. 5 is a graph illustrating the % Fe leached as a function of time for an ore in which the bioleachate off solution was recycled without treatment.

After 34 days, the solution coming off the column was re-applied directly to the top of the column without treatment. This was done to see if the high ferric levels of recirculated solution would speed up the leaching of pyrite. The leaching proceeded, but very slowly. After 91 days, the column was changed back to a single pass system. Shortly after changing back to a single pass solution system, the leaching rate increased. The effects of this change are shown in FIG. 5.

The pH, Eh, Fe concentration, and % Fe leached for the various test times of the effluent solution coming off the column are reported in Table 4.

TABLE 4

| # OF DAYS | pH | Eh (Volts) | Fe (PPM) | % Fe LEACHED |
|---|---|---|---|---|
| 0 | 1.650 | 0.490 | 1414 | 0.570 |
| 2 | 1.570 | 0.490 | 1320 | 1.040 |
| 3 | 1.840 | 0.488 | 680 | 1.180 |
| 4 | 1.980 | 0.496 | 400 | 1.250 |
| 7 | 2.130 | 0.477 | 287 | 1.350 |
| 8 | 2.350 | 0.450 | 198 | 1.370 |
| 9 | 2.430 | 0.530 | 160 | 1.380 |
| 10 | 2.430 | 0.458 | 141 | 1.390 |
| 11 | 2.510 | 0.549 | 128 | 1.410 |
| 14 | 2.480 | 0.577 | 102 | 1.430 |
| 17 | 2.440 | 0.56 | 125 | 1.460 |
| 20 | 2.330 | 0.558 | 218 | 1.530 |
| 23 | 2.170 | 0.555 | 387 | 1.640 |
| 27 | 2.130 | 0.603 | 402 | 1.950 |
| 29 | 2.060 | 0.604 | 406 | 2.080 |
| 34 | 2.130 | 0.609 | 398 | 2.370 |
| 39 | 2.000 | 0.609 | 580 | |
| 42 | 1.980 | 0.607 | 694 | |

TABLE 4-continued

| # OF DAYS | pH | Eh (Volts) | Fe (PPM) | % Fe LEACHED |
|---|---|---|---|---|
| 46 | 1.960 | 0.608 | 1052 | |
| 49 | 1.870 | 0.602 | 1546 | |
| 52 | 1.810 | 0.605 | 1838 | |
| 57 | 1.900 | 0.604 | 2328 | |
| 59 | 1.900 | 0.587 | 2586 | 3.510 |
| 64 | 1.830 | 0.591 | 3624 | |
| 66 | 1.790 | 0.585 | 3930 | |
| 67 | 1.710 | 0.587 | 3942 | |
| 70 | 1.760 | 0.599 | 3778 | |
| 73 | 1.760 | 0.587 | 4368 | |
| 77 | 1.650 | 0.581 | 4984 | |
| 81 | 1.660 | 0.577 | 5424 | |
| 85 | 1.660 | 0.568 | 5912 | |
| 91 | 1.620 | 0.565 | 4912 | |
| 94 | 1.730 | 0.605 | 1722 | 5.400 |
| 100 | 1.770 | 0.620 | 1562 | 6.390 |
| 105 | 1.550 | 0.609 | 2124 | 7.120 |
| 12 | 1.880 | 0.684 | 2760 | 8.030 |
| 119 | 1.670 | 0.671 | 2916 | 9.810 |
| 129 | 1.470 | 0.679 | 3632 | 13.250 |

EXAMPLE 4

Figure 6:
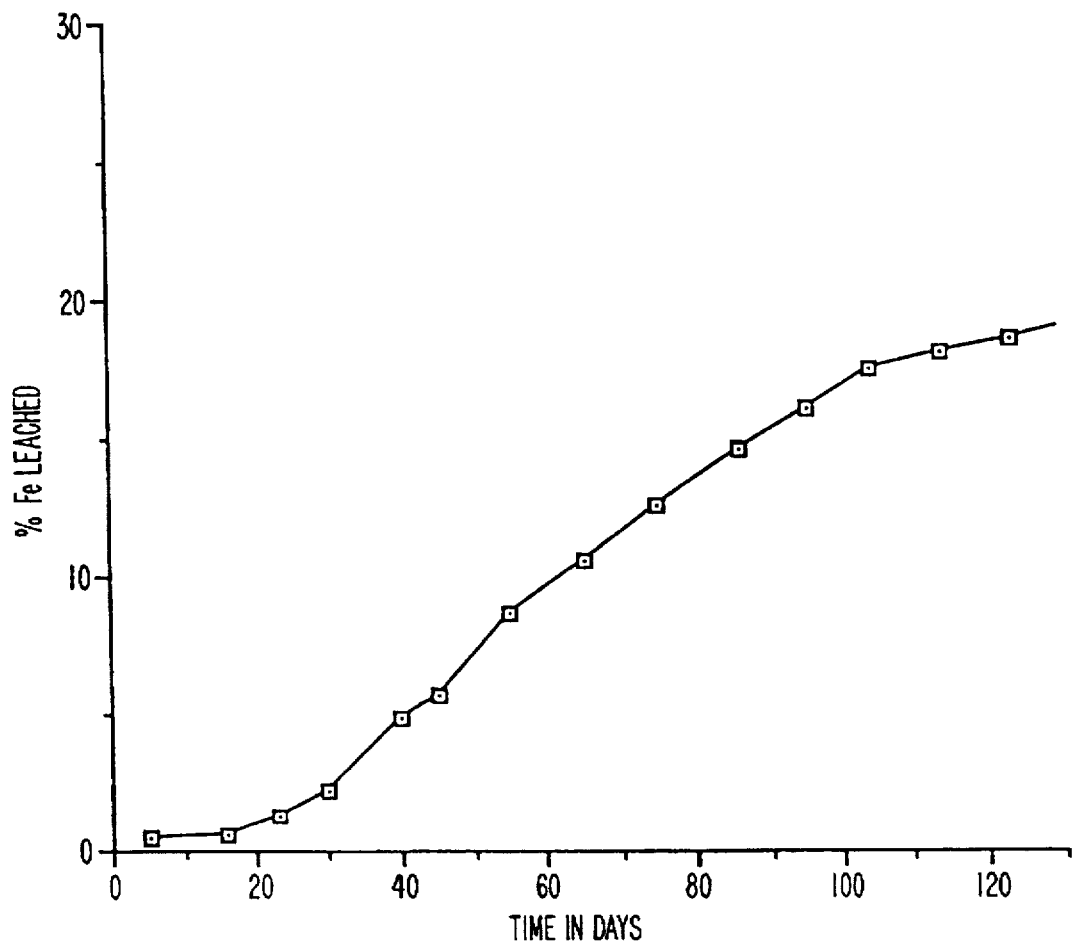
FIG. 6 is a graph illustrating the % Fe leached as a function of time from an ore in which only fresh solution was applied to the ore.

Another column test was performed with the Gilt Edge Mine ore of Example 2. In this example, the −10 mesh material was removed from the ore, and the ore was only crushed to −⅛ inch. The ore was prepared as before and placed into a 3 inch by 6 ft. column with air from the bottom and liquid from the top as in Example 3. Further, only fresh solution was introduced from the top of the column. The rate of leaching was determined by the amount of metal removed as before. The percent of iron leached was plotted in FIG. 6 for comparison to FIG. 5, which represents the whole ore column in Example 3. From this comparison, one can see that the recirculation of leach solution was inhibitory to the rate of biooxidation.

The pH, Eh, and % Fe leached at the various test times of the effluent solution are reported in Table 5.

TABLE 5

| TIME IN DAYS | pH | Eh (Volts) | % Fe Leached |
|---|---|---|---|
| 5 | 1.630 | 0.528 | 0.500 |
| 16 | 1.890 | 0.560 | 0.650 |
| 23 | 1.890 | 0.672 | 1.290 |
| 30 | 1.830 | 0.657 | 2.280 |
| 40 | 1.680 | 0.672 | 4.890 |
| 45 | 1.780 | 0.684 | 5.770 |
| 55 | 1.770 | 0.694 | 8.740 |
| 65 | 1.800 | 0.705 | 10.630 |
| 75 | 1.520 | 0.719 | 12.650 |
| 86 | 1.630 | 0.705 | 14.600 |
| 95 | 1.830 | 0.697 | 16.020 |
| 104 | 1.780 | 0.705 | 17.470 |
| 114 | 1.930 | 0.703 | 18.070 |
| 123 | 2.070 | 0.678 | 18.570 |

EXAMPLE 5

Effluent from a heap biooxidation field test utilizing 4,750 dry short tons of refractory sulfide ore from the Gilt Edge Mine, near Deadwood, S. Dak., was collected 63 days into the test. This ore contained approximately 5.5% sulfides as sulfur and 1.78 g Au/ton of ore. The rate of biooxidation as measured by changes in the sulfate concentration in the effluent solution was lower than desired due to the concentration of inhibitory components in the effluent solution. The effluent solution was being recirculated and applied to the test heap without conditioning.

Samples of the effluent were adjusted to various pH's to ascertain the minimum pH for removal of the toxic components. The effluent had a pH of 2.0. Aliquots of the effluent were adjusted to 3.0, 3.5, 4.0, 4.5, 5.0, and 5.5, with lime, in separate tubes. The supernatant from these aliquots was collected for inhibition testing with *Thiobacillus ferrooxidans*. Ferrous sulfate heptahydrate was added to each supernatant at a concentration of 20 grams per liter, and the pH was adjusted to 1.7–1.9 with sulfuric acid. The electrochemical potential (Eh) of each solution was recorded (Time 0), the solutions were inoculated with *T. ferrooxidans*, and were shaken at 34° C. overnight. The change in Eh was monitored as an indication of biooxidation of the ferrous iron. The results are tabulated in Table 6 below.

Figure 7:
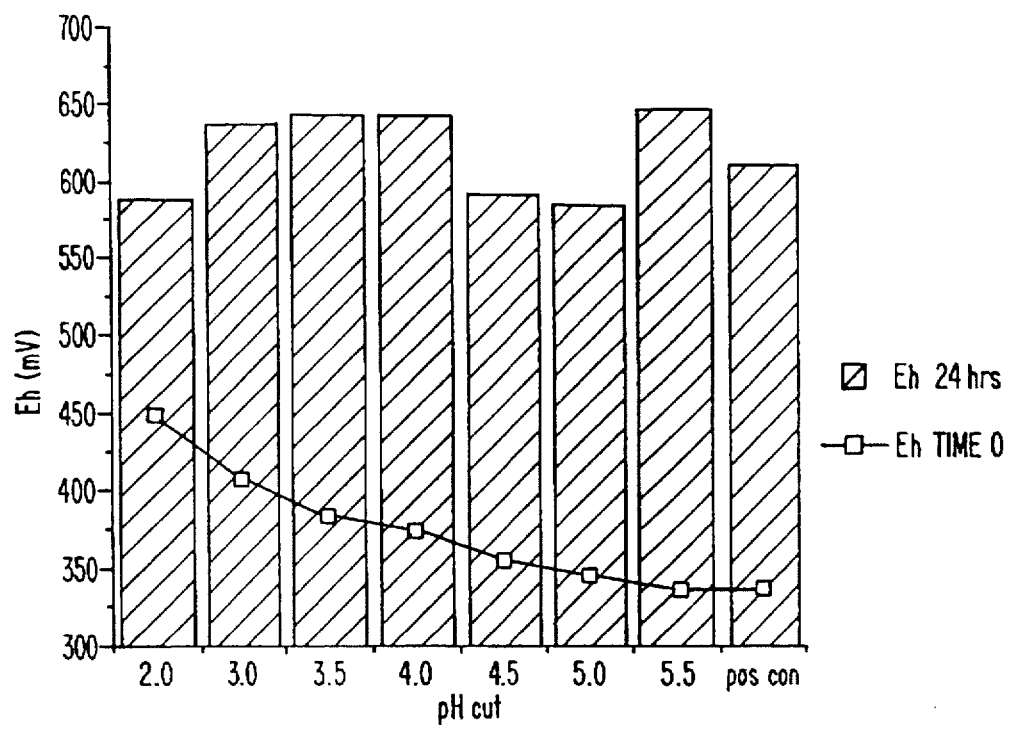
FIG. 7 is a graph illustrating the Eh of various bioleachate solutions at time 0 and after 24 hours had elapsed.

The highest pH supernatant, at 5.5, consistently produced the highest Eh (highest ferric concentration), equaling or surpassing the positive control. The lower pH supernatants showed a smaller increase in the sample Eh, indicative of a lower level of bacterial activity, suggesting incomplete removal of the toxins from the solution as illustrated in FIG. 7. Adjusting the effluent solution to a pH of 5.5 or higher, however, was necessary and sufficient to precipitate all the inhibitory components in the effluent solution for this ore.

Figure 8:
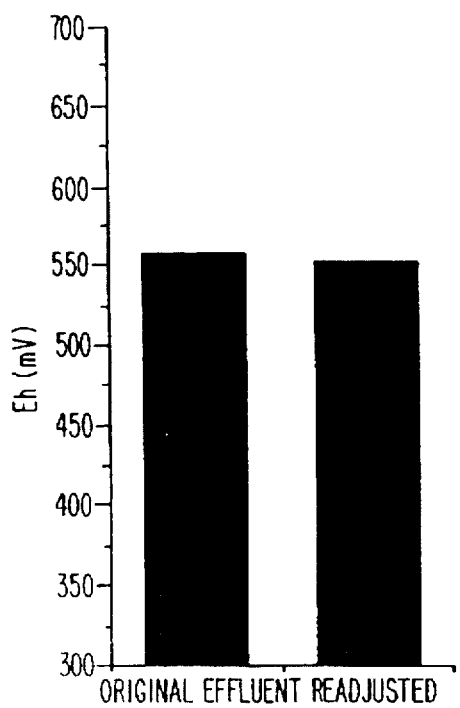
FIG. 8 is a graph comparing the Eh of an original effluent from an ore to that of an effluent which had been adjusted to a pH of 6.0 and then readjusted to a pH of 1.8 without removal of the precipitates formed during the first pH adjustment.

An additional sample of effluent solution was adjusted to a pH 6, with lime, producing a sludge. Without removing the sludge, the pH was readjusted to 1.8. The resulting liquid from this mixture was tested for toxicity to *T. ferrooxidans*. The toxicity of the readjusted mixture was the same as that of the original effluent solution, indicating that all the toxic components precipitated into the sludge at a pH >5.5 and were then resolubilized during adjustment back to pH 1.8 as illustrated in FIG. 8. This example shows the need for removing the metal precipitates during lime or limestone softening before the pH of the solutions is readjusted for biooxidation.

TABLE 6

| SAMPLE | Eh AT START (mV) | Eh AT 24 HRS. (mV) |
|---|---|---|
| UNADJUSTED OFF SOLUTION | 450 | 589 |
| pH 3.0 | 408 | 638 |
| pH 3.5 | 385 | 644 |
| pH 4.0 | 375 | 642 |
| pH 4.5 | 356 | 592 |
| pH 5.0 | 346 | 585 |
| pH 5.5 | 337 | 647 |
| positive control | 339 | 611 |

EXAMPLE 6

A heap biooxidation field test utilizing 4,750 dry short tons of refractory sulfide ore from the Gilt Edge Mine, near Deadwood, S. Dak. was run. The test ore contained 5.5% sulfides as sulfur and 1.78 grams gold per ton of ore. Extraction by conventional bottle roll cyanidation tests yielded a recovery of 56%. After the heap was constructed, it was inoculated with *T. ferrooxidans* and biooxidation was initiated.

Figure 9:
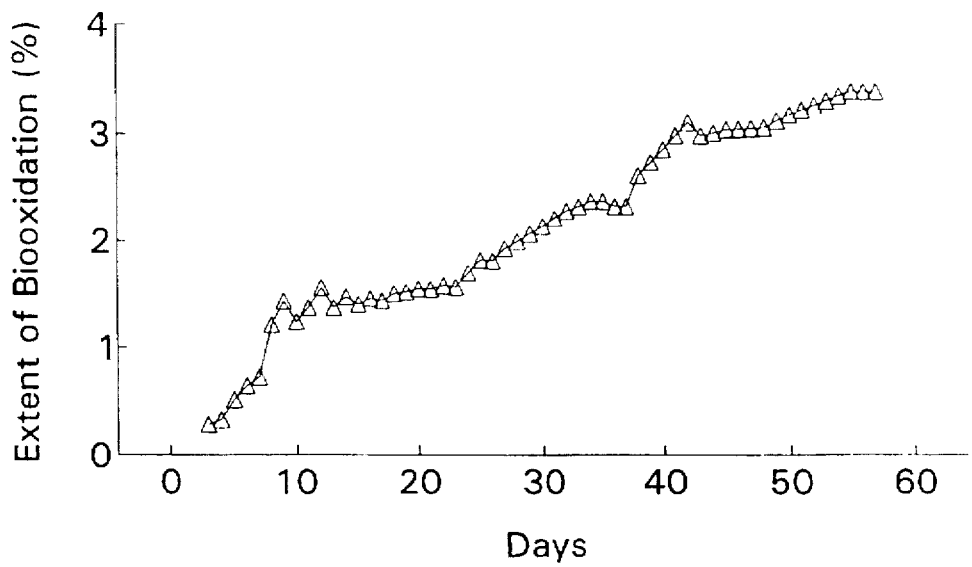
FIG. 9 is a graph illustrating the extent of pyrite biooxidation as a function of time for a pilot heap biooxidation process.

During the heap biooxidation test, the extent of biooxidation was determined by examining the concentration of sulfate ions in the effluent solution. FIG. 9 plots the extent of biooxidation as the percent of sulfides oxidized against the time into the test. Approximately the first 60 days of the biooxidation test are represented in FIG. 9.

All the effluent from the heap was collected in holding tanks, and except as indicated below, the effluent solution was recycled to the top of the heap without conditioning. The effluent was recycled to the top of the heap through drip emitters placed just below the surface of the ore. After the water inventory levels in the heap were established, a constant water inventory was maintained by establishing steady state water circulation, accomplished by using a fixed application rate and supplementing with additional water to keep a constant level in the holding tanks.

Initially, the field test demonstrated a rapid rate of biooxidation, which quickly slowed down. The slowing down corresponds with an increase in the observed solubilized metals including copper in the effluent solution. The initial biooxidation rate was 0.133% per day (day 3 through 13). During this time, the water inventory was being established in the biooxidation heap and fresh water was being applied. With this continuous addition of fresh water the inhibiting components were kept dilute and did not effect the rate of biooxidation. After fresh water was no longer being added to the surface of the heap, at day 13, the biooxidation rate slowed.

At approximately day 23, a batch neutralization of a portion of the heap effluent was conducted by raising the pH of the solution to above 5.5, removing the solid precipitates and then lowering the pH of the solution back to approximately 1.8. After this batch neutralization was performed, the biooxidation rate increased until about day 35 when it leveled off due to increased concentrations of solubilized metals. On day 38 approximately 10% of the effluent solution was pH adjusted to over 5.5, removing the inhibitory components. The rate of biooxidation after removal of these inhibitory components was improved until day 42 when the concentration of inhibitory metals suppressed the biooxidation rate. A small inflection point is also observed at about day 51 in FIG. 9. This was due to the dilution of the inhibitory components in the effluent with fresh water.

Seventy-one days into the heap operation a significant amount of fresh water in the form of precipitation from a rainstorm was added to the heap. The rainfall represented about a 50% increase in the solution inventory. Recirculation was maintained, producing a dilution of the circulating inhibitory components for a limited period of time.

During the two weeks prior to the rainfall, the concentration of soluble sulfate in the recirculating solution increased linearly. After the rainfall, eight days were required to reestablish a steady state solution recirculation. For the next two weeks there was an increase in the rate of biooxidation. Then the rate of biooxidation returned to the levels seen before the rain fall. A time line depicting the important events and the rate of soluble sulfate concentration increase for the weeks prior and after the first precipitation event is shown below:

| Day 57–71 - | Rate of Sulfate conc. increase was 168.4 ppm/day |
| Day 72–80 - | 11 inch rainfall |
| Day 81–88 - | Reestablish recirculation steady state |
| Day 89–96 - | Rate of sulfate conc. increase was 223.5 ppm/day |
| Day 97–117 - | Rate of sulfate conc. increase was 168.0 ppm/day |

The temporary dilution of the recirculating solution associated with the precipitation caused a decrease in the concentration of inhibitory materials. As a result, the rate of sulfate ion concentration increase in the off solution accelerated. However, as additional inhibitory components leached out of the ore and the solution inventory returned to its pre-precipitation levels, the rate of biooxidation also returned to its prerainfall level.

Later in the operation of the heap, a second major precipitation event occurred. This rainfall was 9 inches over 3 days. At this time no recirculation of effluent solution was being conducted, thus the rainfall produced a flushing of the inhibitory components from the test heap. All the effluent draining from the heap was being discarded. The sulfate ion concentration, total liquid discharged and total pounds of sulfate discarded for the periods prior, during and after the rainfall are shown in Table 7.

TABLE 7

| Event | Day | Avg. $[SO_4]^{-2}$ (ppm) | Avg. Solution Discharge (gal./day) | Avg. $[SO_4]^{-2}$ (lbs./day) |
|---|---|---|---|---|
| Before Rain | 276–286 | 35,300 | 827 | 243 |
| During Rain | 287–289 | 64,300 | 18,500 | 9,921 |
| Immediately After Rain | 290–294 | 72,600 | 2,546 | 1,541 |
| Later | 295–309 | 76,939 | 1,530 | 981 |
| Till End of Test | 310–326 | 55,482 | 1,093 | 505 |

The concentration and total amount of sulfate discarded from the test heap increased as a result of the flushing caused by the rainfall, indicating that inhibitory compounds were removed from the heap and that the rate of biooxidation increased for the remainder of the test.

EXAMPLE 7

A three column system was constructed to simulate a large scale heap biooxidation process. Three batches of ⅛ inch crushed and agglomerated ore that had been spayed with bacteria, each of about 8 kg, were placed into three different columns having a diameter of 3 inches and a height of 6 feet. Only the first of the three columns was provided with air flow. The other two columns were closed to simulate the air limitation that may occur in a large heap. The test was started by applying fresh 0.2 strength 9K salts having a pH of 1.8 to the top of the first column at the rate of about 200 mL/day or 0.0007 gal/ft²/min.

After about three days, the solution eluting off the bottom of the first column was pumped onto the second column without any treatment. After another three days, the solution eluting from the second column was pumped onto the third column. The solution eluting from the third column was collected until the volume was over one liter.

After 15 days of operation, the first liter was treated with powdered limestone to raise the pH to over 5.5. The precipitate was removed by filtration. The treated solution was then mixed back with untreated off solution at the rate of 85% treated solution (over pH 5.5) and 15% untreated solution (pH 1.6 or lower). If the resulting mixture was above pH 2.0, then sulfuric acid was used to adjust the pH back down to 2.0 or below.

After 18 days from the start of the operation, the mixture of treated and untreated off solution was used to replace the addition of fresh pH 1.8 solution to the first column. With time, the volume of liquid decreased to the point where fresh solution had to be added to the system to make up for water removed in the precipitation process and lost to evaporation. This system was meant to mimic a field operation where as much water as possible must be recycled. This system also made use of the acid generated from the biooxidation process to adjust the pH back down to below 2 after the lime or limestone treatment.

The first recycled solution took about 10 days to move through the three columns. A small drop in the rate of biooxidation was noted between the period between day 29 and day 31. The recycled solution was first used on day 18 and took about 10 days to pass through all three columns. This meant that it would be day 28 when a change would show up in the biooxidation rate. The rate of iron leaching dropped from 0.132%/day to 0.103%/day. This change was considered small enough that the system was working at removing the build-up of toxic metals in the bioleachate off solution. Further, the re-use of most of the water in the system was considered of sufficient economic value to justify the small drop in the biooxidation rate over the rate obtainable by using fresh solution only.

The pH, Eh, Fe concentration, and % Fe leached are reported in Table 8 below for various times in the biooxidation process. These values were determined by testing the heap effluent at the times indicated in the table.

TABLE 8

| # OF DAYS | pH | Eh (Volts) | Fe (PPM) | % Fe LEACHED |
|---|---|---|---|---|
| 15 | 1.820 | 0.576 | 6928 | 0.470 |
| 18 | 1.770 | 0.590 | 5116 | 0.700 |
| 24 | 1.680 | 0.614 | 8640 | 1.320 |
| 29 | 1.480 | 0.540 | 10136 | 1.980 |
| 31 | 1.490 | 0.507 | 7712 | 2.290 |
| 39 | 1.600 | 0.542 | 7312 | 2.960 |

Figure 10:
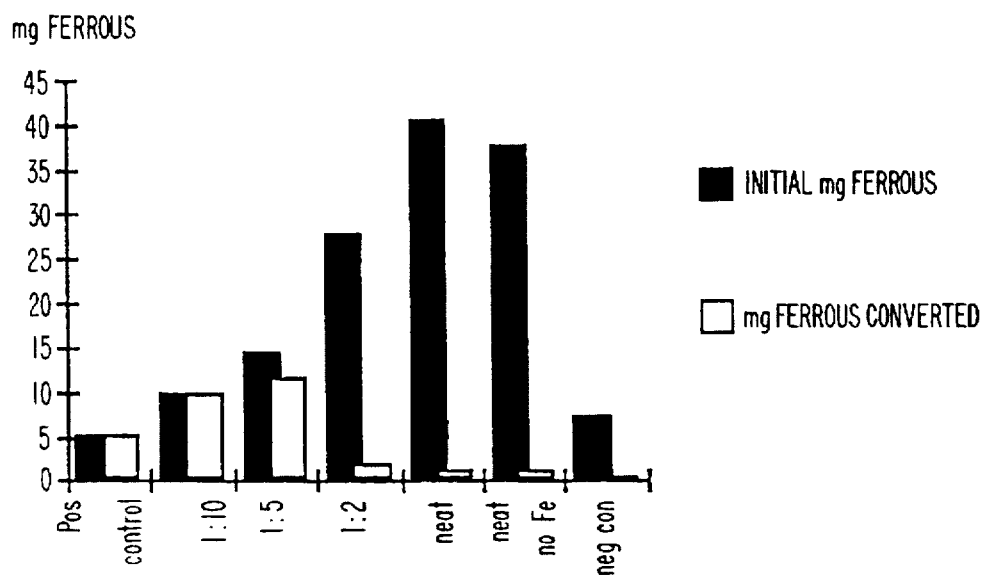
FIG. 10 is a graph illustrating the amount of ferrous ion converted to ferric ion for various samples.

This test was conducted to determine acute and chronic toxicity in the modified *T. ferrooxidans* strain used by the inventors. Dilutions of an effluent produced in the early stages of a column biooxidation were tested using the microtiter plate assay for their ability to inhibit the iron oxidizing activity of *T. ferrooxidans* ("acute" toxicity). As seen in FIG. 10, when compared against a positive control sample of *T. ferrooxidans* in a ferrous sulfate medium, only the 1:10 and 1:5 dilutions allowed adequate iron oxidation. The lower dilutions (1:2 and undiluted) inhibited most of the iron oxidizing activity of the cells.

Figure 11:
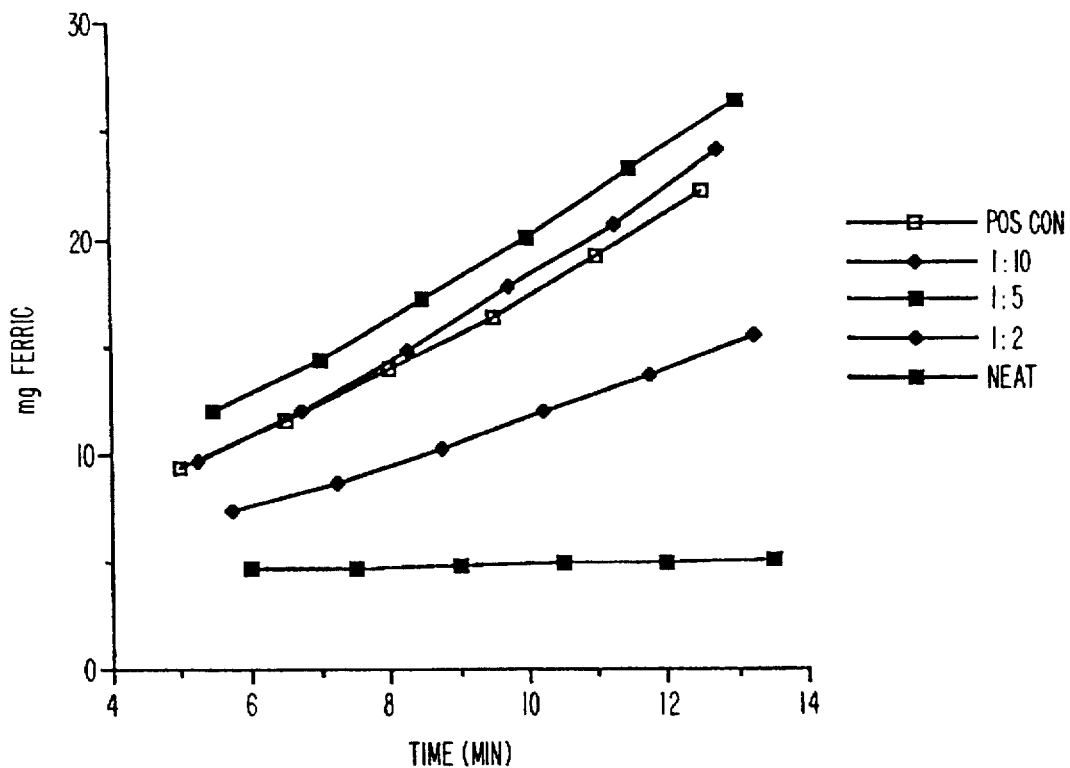
FIG. 11 is a graph illustrating the mg of ferric ion in various solutions as a function of time.

The "chronic" toxicity of the effluent dilutions was tested next with the spectrophotometric activity assay. Cells from the microtiter plate assay were collected, washed, and resuspended in a 0.2 strength 9K salts medium to which 2 mg/ml ferrous sulfate was added. The concentration of ferric iron produced was measured over time and plotted in FIG. 11. The rates of activity were calculated from the resulting curves in FIG. 11. These values are reported in Table 9. The activities of the effluent-exposed cells, in fresh medium, were similar to the activities of the cells in effluent. Similar results were obtained when the spectrophotometric activity assay was repeated after overnight incubation of the cells in ferrous sulfate medium. The results suggest that the effluent can inhibit the cells for some time after they are removed from direct contact with the inhibitory effluent.

TABLE 9

| SAMPLE | FERROUS-FERRIC CONVERSION RATE (mg/min) |
|---|---|
| Positive control | 1.72 |
| 1:10 dil. | 1.92 |
| 1:5 dil. | 1.94 |
| 1:2 dil. | 1.10 |
| neat | .06 |

EXAMPLE 9

Figure 12:
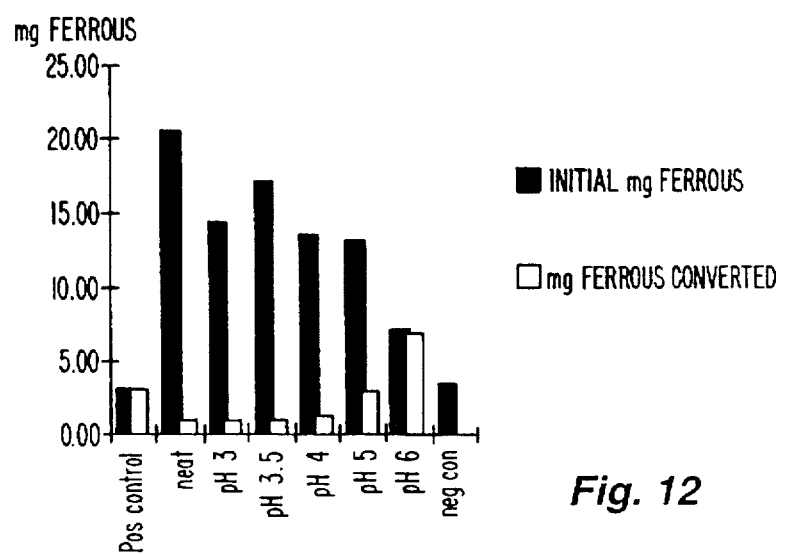
FIG. 12 is a graph illustrating the amount of ferrous ion converted to ferric ion for various samples.

As discussed above, one method for treating a biooxidation effluent which is inhibitory to *T. ferrooxidans* is to raise the pH enough to precipitate the inhibitory substances and then readjust the pH to the optimum range for biooxidation after separating out the precipitates. This procedure was performed with the effluent from Example 8, and the resulting supernatant solutions were tested for their ability to inhibit the bacteria in the microtiter plate assay. The results, shown in FIG. 12, indicate that the inhibition is removed at a pH of between 5 and 6. Partial activity is seen in pH 5 supernatant and full activity is restored by pH 6.

EXAMPLE 10

Figure 13:
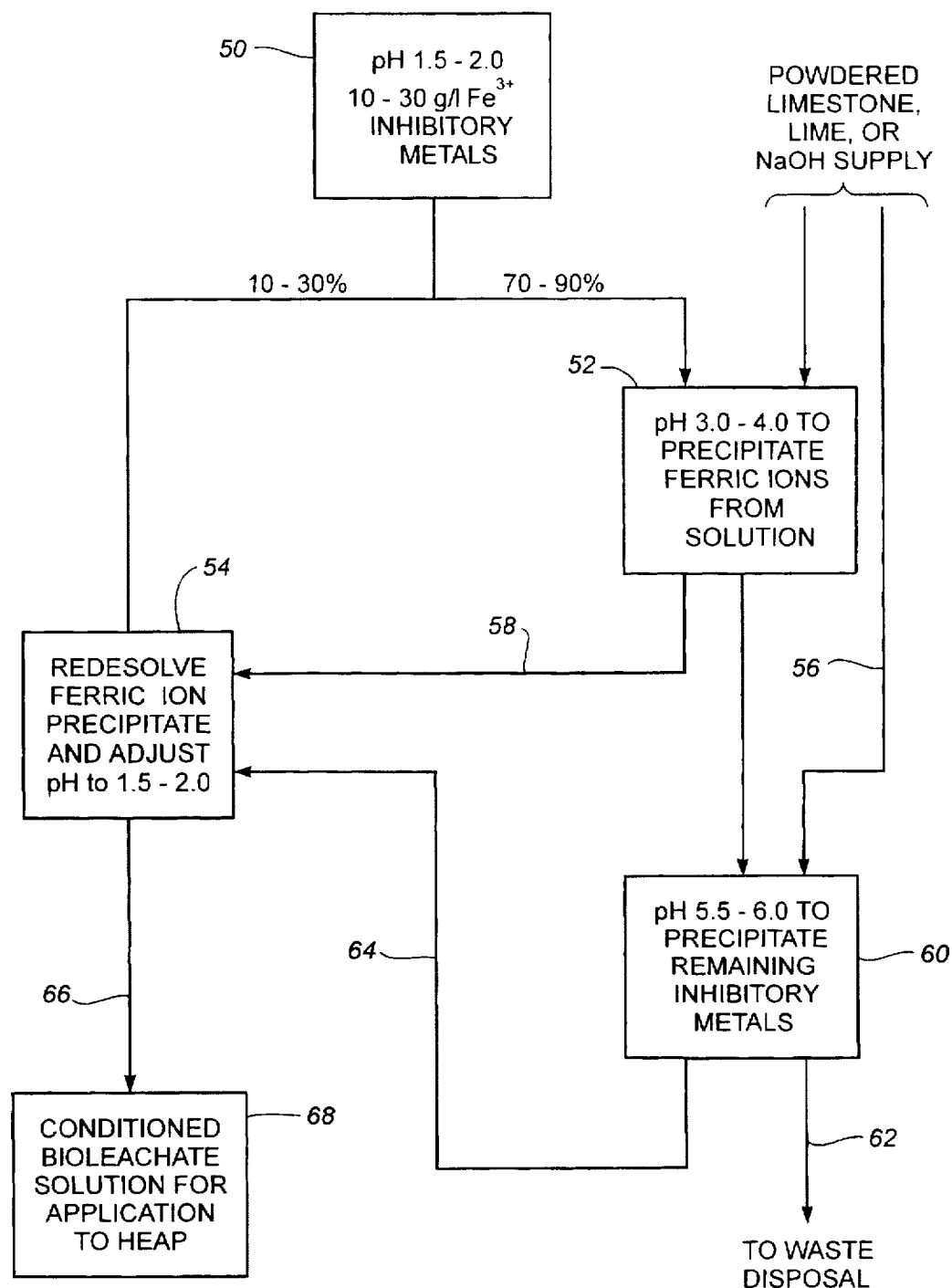
FIG. 13 is a flow diagram of a solution managment system according to another embodiment of the present invention.

The present example is described in connection with FIG. 13, which illustrates a preferred solution management system according to the present invention for producing a conditioned bioleachate off solution 66 that can be recycled to a heap of refractory sulfide ore to promote biooxidation with little or no inhibitory effect.

According to the present example, a bioleachate off solution containing a plurality of inhibitory metals is collected in a holding tank 50. The bioleachate off solution is collected from one or more heaps under biooxidation, and, in addition to having a plurality of inhibitory metals, the off solution will typically contain from about 10–30 g/l ferric ion and have a pH of 1.0 to 1.5. Furthermore, due to the combined concentration of at least two of the inhibitory metals, the heap biooxidation rate of the bioleachate off solution is inhibited as compared to a positive control. To minimize the amount of alkaline material required to condition the off solution, approximately 70 to 90% of the collected bioleachate off solution is pumped to a preliminary softening tank 52, and the other 10 to 30% of the collected bioleachate off solution is pumped directly to mixing tank 54. The bioleachate off solution pumped to preliminary softening tank 52 is subjected to a preliminary softening. This is accomplished by raising the pH of the bioleachate off solution to a pH sufficient to precipitate the ferric ion in solution while minimizing the amount of inhibitory metals precipitated. Typically a pH in the range of approximately 3.0 to 4.0 will be sufficient to accomplish this goal.

The pH of the bioleachate off solution pumped to preliminary softening tank 52 can be raised using any strong base, including powdered limestone, lime, or sodium hydroxide.

The precipitate 58 formed during the preliminary softening is separated from the pretreated off solution 56. The precipitate 58, which will be high in ferric ion, is then pumped in slurry form to mixing tank 54, and the pretreated off solution 56 is pumped to softening tank 60. The pH of pretreated off solution 56 is then raised to a pH of at least 5.0, and preferably to a pH within the range of approximately 5.5 to 6.0, in softening tank 60 using limestone or lime. The precipitate 62 formed during this final softening step is removed and sent to waste treatment for disposal. Precipitate 62 should contain most of the inhibitory metals remaining in pretreated off solution 56. The aqueous supernatant 64 produced in softening tank 60 is pumped to mixing tank 54. The pH of the aqueous supernatant 64 will depend on the pH that is used to further soften the pretreated off solution 56 in softening tank 60. However, typically it will be in the range of about 5.5 to 6.0. Aqueous supernatant 64 should be substantially free of inhibitory metals at this point.

The untreated bioleachate off solution pumped from holding tank 50 to mixing tank 54, precipitate 58 and aqueous supernatant 64 are combined in mixing tank 54. The acid in the untreated bioleachate off solution should be sufficient to lower the pH of the entire solution in mixing tank 54 to the range of about 1.5 to 2.0 and concomitantly redissolve ferric precipitate 58 in the mixture. Should the final pH of the solution in mixing tank 54 be outside the range desired for biooxidation, appropriate adjustments can be made through further acid or base additions. The final concentration of ferric ion in the mixing tank 54 solution should be in the range of about 5 to 20 g/l. Thus, only enough ferric precipitate 58 need be added to mixing tank 54 to result in a final concentration within this range. Excess precipitate 58 can be stored or sent to waste treatment for disposal.

Once the pH of the solution within mixing tank 54 is adjusted to an appropriate pH for biooxidation and the ferric ion concentration of the solution is within the preferred range of 5 to 20 g/l, conditioning of the bioleachate off solution is complete and the conditioned bioleachate off solution 66 is pumped to holding tank 68 from which it can be pumped to a heap of refractory sulfide ore to promote biooxidation. Alternatively, conditioned bioleachate off solution 66 can be used to agglomerate refractory sulfide ore particles during the heap formation process.

Although the invention has been described with reference to preferred embodiments and specific examples, it will readily be appreciated by those of ordinary skill in the art that many modifications and adaptations of the invention are possible without the departure from the spirit and scope of the invention as claimed hereinafter.

We claim:

1. A method for improving the biooxidation rate of a heap comprised of refractory sulfide ore particles that is at least partially biooxidized using a bioleachate off solution that includes a plurality of inhibitory materials dissolved therein, including ferric ion wherein the concentration of each individual inhibitory material in the bioleachate off solution is below its individual inhibitory concentration, yet the combined concentration of at least two of the inhibitory materials is sufficient to inhibit the biooxidation rate of the refractory sulfide ore particles in the ore, the process comprising:

a. collecting the bioleachate off solution;
    b. dividing the bioleachate off solution into a first portion and a second portion;
    c. treating the first portion of the bioleachate off solution to remove at least some of the inhibitory materials dissolved therein;
    d. combining the first and second portions of the bioleachate off solution to thereby form a conditioned bioleachate off solution;
    e. recycling the conditioned bioleachate off solution to the heap; and
    f. biooxidizing the refractory sulfide ore particles in the heap with the conditioned bioleachate off solution.

2. A method according to claim 1, wherein the method of treating is at least one selected from the group consisting of lime softening, limestone softening, ion exchange, electrodeposition, iron cementation, and reverse osmosis.

3. A method according to claim 1, wherein the first portion comprises 70 to 90% of the bioleachate off solution collected.

4. A method according to claim 1, wherein the method of treating the first portion comprises:

a. raising the pH of the first portion to a pH of at least 5.0 and thereby forming a precipitate; and
    b. removing the precipitate from the first portion.

5. A method according to claim 4, further comprising adding ferric ion to the conditioned bioleachate off solution.

6. A method according to claim 5, wherein sufficient ferric ion is added to the conditioned bioleachate off solution to raise the ferric ion concentration of the conditioned bioleachate off solution to within the range of 5 to 20 g/l.

7. A method according to claim 4, wherein the pH of the first portion of the bioleachate off solution is raised to a pH of at least 5.5.

8. A method according to claim 4, wherein the pH of the first portion of the bioleachate off solution is raised to a pH of at least 6.0.

9. A method according to claim 4, wherein the pH of the first portion of the bioleachate off solution is raised to a pH in the range of 5.0 to 6.0.

10. A method according to claim 4, wherein the pH of the first portion of the bioleachate off solution is raised to a pH in the range of 5.5 to 6.0.

11. A method according to claim 1, wherein the method of treating the first portion comprises:

a. raising the pH of the first portion to a pH in the range of 3.0 to 4.0 and thereby forming a first precipitate including precipitated ferric ion;
    b. removing the first precipitate from the first portion;
    c. raising the pH of the first portion to a pH of at least 5.0 after removal of the first precipitate and thereby forming a second precipitate;
    d. removing the second precipitate from the first portion.

12. A method according to claim 11, further comprising adding at least a portion of the first precipitate to the conditioned bioleachate off solution to increase its ferric ion content.

13. A method according to claim 12, wherein a sufficient amount of the first precipitate is added to the conditioned bioleachate off solution to raise the ferric ion concentration of the conditioned bioleachate off solution to within the range of 5 to 20 g/l.

14. A method according to claim 11, wherein the first portion comprises 70 to 90% of the bioleachate off solution collected.

15. A method as in one of claims 4-14, further comprising the step of adjusting the pH of the conditioned bioleachate off solution to a pH suitable for biooxidation.

16. A method according to claim 15, wherein the pH of conditioned bioleachate off solution is adjusted to a pH in the range of 1.2 to 2.6.

17. A method according to claim 1, wherein the bioleachate off solution collected is obtained from the heap.

18. A method according to claim 1, wherein the bioleachate off solution collected is obtained from a second heap comprised of refractory sulfide ore particles that is being biooxidized.

19. A method according to claim 1, wherein the conditioned bioleachate off solution is recycled to the heap by a. agglomerating refractory sulfide ore particles with the conditioned bioleachate off solution; and b. adding the agglomerated refractory sulfide ore particles to the heap.

20. A method for improving the biooxidation rate of a heap of refractory sulfide ore particles that is at least partially biooxidized using a bioleachate off solution, including ferric ion the process comprising:

a. raising the pH of the bioleachate off solution to a pH in the range of about 3.0 to 4.0 and thereby forming a first precipitate including precipitated ferric ions;

b. removing the first precipitate from the bioleachate off solution;

c. raising the pH of the bioleachate off solution to a pH of at least 5.0 following the removal of the first precipitate and thereby forming a second precipitate;

d. removing the second precipitate from the bioleachate off solution;

e. adjusting the pH of the bioleachate off solution to a pH suitable for biooxidation following the removal of the second precipitate and thereby forming a conditioned bioleachate off solution;

f. adding at least a portion of the first precipitate to the conditioned bioleachate off solution;

g. recycling the conditioned bioleachate off solution to the heap; and h. biooxidizing the refractory sulfide ore particles in the heap with the conditioned bioleachate off solution.

21. A method according to claim 20, wherein the pH of the bioleachate off solution is raised to a pH of at least 5.5 in step c.

22. A method according to claim 20, wherein a sufficient amount of the first precipitate is added to the conditioned bioleachate off solution to raise the ferric ion concentration of the conditioned bioleachate off solution to within the range of 5 to 20 g/l.

23. A method as in one of claims 20–22, wherein the pH of the bioleachate off solution is adjusted to the range of 1.2 to 2.6 following the removal of the second precipitate.

24. A method according to claim 20, wherein the bioleachate off solution originates from the heap.

25. A method according to claim 20, wherein the bioleachate off solution originates from a second heap comprised of refractory sulfide ore particles that is being biooxidized.

26. A method for improving the biooxidation rate of a heap of refractory sulfide ore particles that is at least partially biooxidized using a bioleachate off solution, the process comprising:

a. collecting the bioleachate off solution;

b. dividing the bioleachate off solution into a first portion and a second portion;

c. raising the pH of the first portion to a pH of at least 5.0 and thereby forming a precipitate;

d. removing the precipitate from the first portion;

e. combining the first and second portions of the bioleachate off solution to thereby form a conditioned bioleachate off solution;

f. recycling the conditioned bioleachate off solution to the heap; and g. biooxidizing the refractory sulfide ore particles in the heap with the conditioned bioleachate off solution.

27. A method according to claim 26, wherein the first portion comprises 70 to 90% of the bioleachate off solution collected.

28. A method according to claim 26, further comprising adding ferric ion to the conditioned bioleachate off solution.

29. A method according to claim 28, wherein sufficient ferric ion is added to the conditioned bioleachate off solution to raise the ferric ion concentration of the conditioned bioleachate off solution to within the range of 5 to 20 g/l.

30. A method according to claim 26, wherein the pH of the first portion of the bioleachate off solution is raised to a pH of at least 5.5.

31. A method according to claim 26, wherein the pH of the first portion of the bioleachate off solution is raised to a pH of at least 6.0.

32. A method according to claim 26, further comprising the following steps, which are performed prior to the step of raising the pH of the first portion to a pH of at least 5.0:

a. raising the pH of the first portion to a pH in the range of 3.0 to 4.0 and thereby forming a precipitate containing ferric ion; and b. removing the ferric ion containing precipitate from the first portion.

33. A method according to claim 32, further comprising adding at least a portion of the ferric ion containing precipitate to the conditioned bioleachate off solution to increase its ferric ion content.

34. A method according to claim 33, wherein a sufficient amount of the ferric ion containing precipitate is added to the conditioned bioleachate off solution to raise the ferric ion concentration of the conditioned bioleachate off solution to within the range of 5 to 20 g/l.

35. A method according to claim 32, wherein the first portion comprises 70 to 90% of the bioleachate off solution collected.

36. A method as in one of claims 26–35, further comprising the step of adjusting the pH of the conditioned bioleachate off solution to a pH suitable for biooxidation.

37. A method according to claim 36, wherein the pH of conditioned bioleachate off solution is adjusted to a pH in the range of 1.2 to 2.6.

38. A method according to claim 26, wherein the bioleachate off solution collected is obtained from the heap.

39. A method according to claim 26, wherein the bioleachate off solution collected is obtained from a second heap comprised of refractory sulfide ore particles that is being biooxidized.

40. A method according to claim 26, wherein the bioleachate off solution is recycled to the heap by a. agglomerating refractory sulfide ore particles with the conditioned bioleachate off solution; and b. adding the agglomerated refractory sulfide ore particles to the heap.

* * * * *